(12) United States Patent
Parks et al.

(10) Patent No.: US 6,598,174 B1
(45) Date of Patent: Jul. 22, 2003

(54) METHOD AND APPARATUS FOR STORAGE UNIT REPLACEMENT IN NON-REDUNDANT ARRAY

(75) Inventors: Ronald Parks, Danville, CA (US); Alastair Taylor, San Jose, CA (US); James A. Taylor, Livermore, CA (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 09/559,713

(22) Filed: Apr. 26, 2000

(51) Int. Cl.[7] ........................... G06F 11/16; G06F 12/16
(52) U.S. Cl. ..................... 714/6; 714/7; 714/5; 711/162
(58) Field of Search ................................ 711/114, 112, 711/162, 165, 170; 714/6, 1, 2, 5, 7, 26, 42

(56) References Cited

U.S. PATENT DOCUMENTS

| | | | | |
|---|---|---|---|---|
| 5,090,014 A | * | 2/1992 | Polich et al. ................. | 714/26 |
| 5,371,882 A | * | 12/1994 | Ludlam .......................... | 714/7 |
| 5,410,439 A | * | 4/1995 | Egbert et al. ................. | 360/75 |
| 5,633,767 A | * | 5/1997 | Boutaghou et al. ........... | 360/53 |
| 5,727,144 A | * | 3/1998 | Brady et al. .................... | 714/6 |
| 5,973,870 A | * | 10/1999 | Boutaghou et al. ........... | 360/53 |
| 6,223,252 B1 | * | 4/2001 | Bandera et al. .............. | 711/114 |

* cited by examiner

*Primary Examiner*—B. James Peikari
(74) *Attorney, Agent, or Firm*—Hamilton & Terrile, LLP; Stephen A. Terrile

(57) ABSTRACT

A method and apparatus used in a storage network facilitates the protection of data in, and replacement of, storage devices about to fail before the failure happens. In a network that includes a set of storage devices organized as a non-redundant (for example RAID 0) array, a storage device about to fail in the non-redundant array can be replaced by another storage device, typically from a pool of spares. The method includes detecting a condition of a first particular storage device in the non-redundant array. Conditions which are detected according to various embodiments indicate that the first particular storage device is suffering events indicating that it is likely to fail, or otherwise suffering from reduced performance. The conditions are detected for example, by the receipt of a signal from the storage device itself, or by the monitoring of statistics concerning the performance of the storage device. The method further provides for selecting a particular spare storage device, which can be used in place of the first particular storage device. In response to detecting the condition, data stored in the first particular storage device is migrated to the second particular storage device, and the second particular storage takes the place of the first particular storage device in the non-redundant array. The first particular storage device can then be gracefully removed from the network without loss of service to the clients computers.

40 Claims, 17 Drawing Sheets

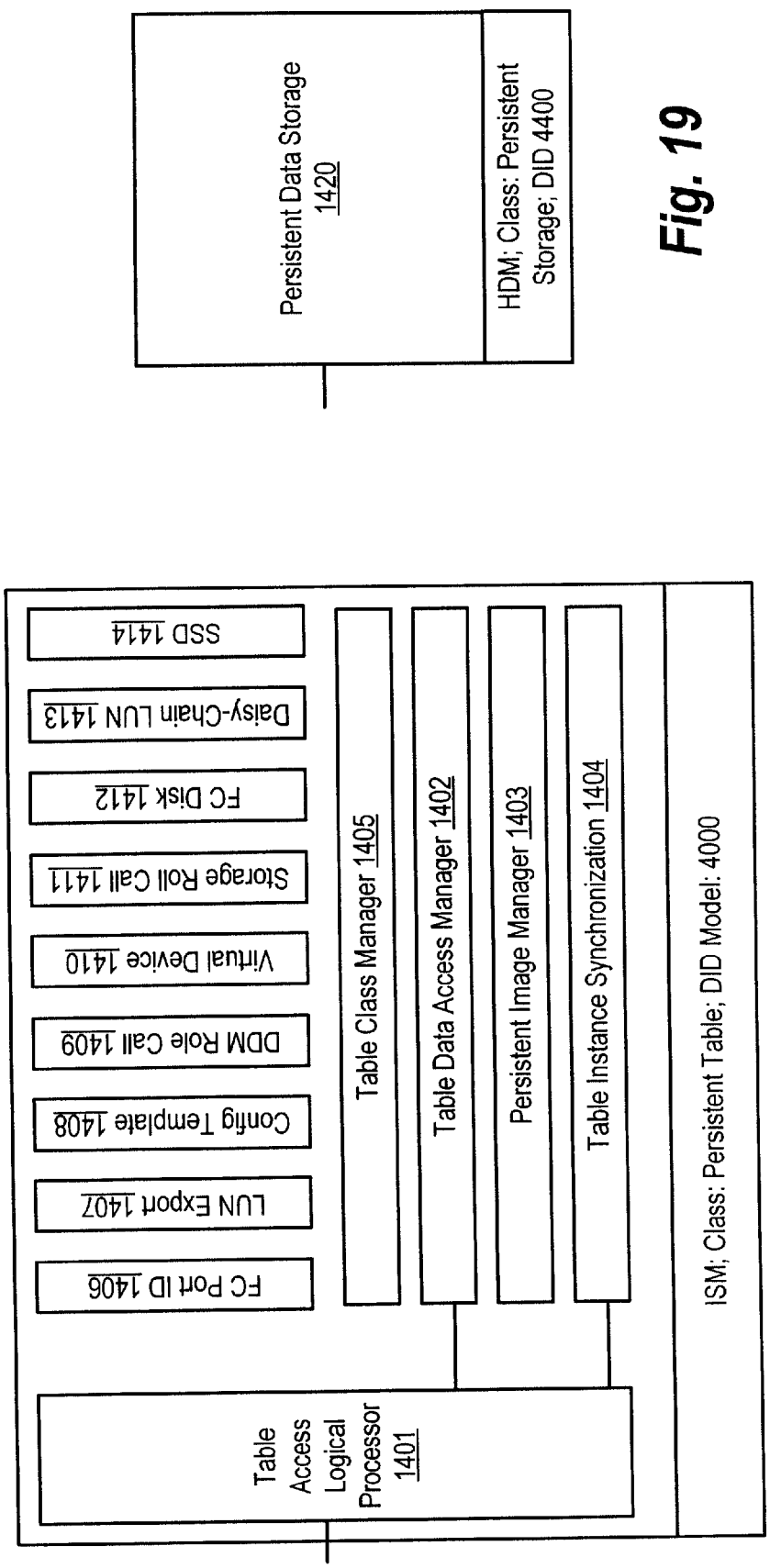

METHOD AND APPARATUS FOR STORAGE UNIT REPLACEMENT IN NON-REDUNDANT ARRAY

RELATED APPLICATION REFERENCE

The present application is related to co-pending applications U.S. patent application Ser. No. 09/461,779, entitled METHOD AND APPARATUS FOR STORAGE UNIT REPLACEMENT ACCORDING TO ARRAY PRIORITY, invented by Ronald L. Parks, Alastair Taylor, and James A. Taylor, and filed Dec. 15, 1999. The present application is also related to co-pending U.S. application Ser. No. 09/455,106, entitled METHOD AND SYSTEM FOR MANAGING DATA MIGRATION FOR A STORAGE SYSTEM, invented by James A. Taylor, Alan R. Merrell, Ronald L. Parks, and Alastair Taylor, and filed Dec. 6, 1999.

The present application is also relate to co-pending application U.S. patent application Ser. No. 09/276,428, STORAGE SERVER SYSTEM, invented by Shari J. Nolan, JeffreY S. Naspor, George W. Harris, Jr., Jerry Lane Parker, and Alan R. Merrell, and filed Mar. 25, 1999.

The present application is also relate to co-pending application U.S. patent application Ser. No. 09/347,042, VIRTUAL DEVICE ARCHITECTURE FOR STORAGE SYSTEM, invented by Alan R. Merrell, Joseph Altmaier, Jerry Lane Perker, and Micheal G. Panas, and filed Jul. 6, 1999.

The present application is also relate to co-pending application U.S. patent application Ser. No. 09/428,213, HOUSING FOR DATA PROCESSING SYSTEM, invented by Shari J. Nolan, Jeffrey S. Naspor, George W. Harris, Jr., Jerry Lane Parker, Alan R. Merrell, Richard A. Lagueux, and Michael G. Panas, and filed Jan. 12, 1999.

BACKGROUND OF THE INVENTION

1. Field of the Invention

This invention relates to the field of mass storage systems. In particular, the invention relates to the management of storage transactions in, and the configuration of, intelligent storage area networks for the purposes of allocating and changing the allocation of storage resources.

2. Description of the Related Art

The storage of large amounts of data in so-called mass storage systems is becoming a common practice. Mass storage systems typically include storage devices coupled to file servers on data networks. Users in the network communicate with the file servers for access to the data. The file servers are typically connected to specific storage devices via data channels. The data channels are usually implemented with point-to-point communication protocols designed for managing storage transactions.

As the amount of storage increases, and the number of file servers in communication networks grows, the concept of a storage area network (SAN) has arisen. Storage area networks connect a number of mass storage systems in a communication network which is optimized for storage transactions. For example, Fibre Channel arbitrated loop (FC-AL) networks are being implemented as SANs. The SANs support many point-to-point communication sessions between users of the storage systems and the specific storage systems on the SAN.

File servers and other users of the storage systems are configured to communicate with specific storage media. As the storage systems expand or media is replaced in the system, re-configuration is required at the file servers and other users. Also, if a need arises to move a data set from one device to another, in a so-called data migration operation, it is often necessary to block access to the data set during the migration process. After migration is complete, re-configuration at the user system must be executed to make the data available from the new device. The blocking of access to the data set during the transfer is a particularly costly action for large data sets having many users. Both the amount of time required to move a copy of the data to the new device, and the number of people inconvenienced can be very large. The above identified related application entitled *Method And System For Managing Data Migration For a Storage System*, describes solutions to many of the problems associated with migrating data sets among devices in a storage network.

Also, failures of devices in the storage network can occur. Upon failure of a device in an array, data is lost or performance suffers while the data on the failed device is reconstructed. When failure occurs, replacement devices may be needed to recover network performance. The insertion of replacement devices requires data migration operations from backup systems, or from redundant storage in the network. Thus, device failures cause additional problems for network administration.

Data sets are stored in sets that include arrays of storage devices in order to improve the performance of data storage transactions, and to improve fault tolerance in data storage systems. Common configurations for arrays of storage devices are known as RAID levels. For example, RAID 0 consists of a striped Disk Array. The data in a RAID 0 array is broken down into data sets referred to as blocks, and each block is written on a separate disk drive or storage device. RAID 1 consists of mirrored and duplexed sets of storage devices. RAID 3 consists of a set of storage devices on which data blocks are subdivided into stripes, which are written on multiple storage devices. In addition, stripe parity is generated on writes and stored within the array for each striped data block, and checked during reads of the data. In a RAID 5 arrays, data blocks are written on the disks within the array, and parity for the blocks of the same rank is generated on writes. The block parity is recorded in distributed locations within array, and checked during reads. A variety of other RAID levels are well-known. Recovery from failures of storage devices involved in RAID configurations, or in other sets of storage arrays used to store a data set, involves a variety of mechanisms and procedures which can make administration of a storage system complex.

Modern storage devices, such as hard disk drives, are extremely reliable, with a typical mean time between failure rating of 300,000 hours or more. However, as the number of disk drives per system increases with storage area network technology, and the size of the typical disk drive grows, administrators will experience failures of even very reliable devices. Thus, technology is being developed to elevate the protection of user data. For example, systems have been designed for self-monitoring analysis and reporting in disk drives. For example, the so-called S.M.A.R.T. system developed by Compaq Computer provides for disk drives and other storage devices to generate signals that communicate their predicted reliability status to users and system administrators. With this information, an administrator is able to prevent system downtime, productivity loss and even the loss of valuable data if appropriate corrective action is taken. Other utilities have also been developed for the purposes of diagnosing storage device reliability status.

In many systems, high speed data access is needed. Often, high speed systems are implemented in non-redundant arrays, such as RAID 0 arrays. In non-redundant arrays, failure of devices causes loss of data. Also, replacement of a failed device blocks access to the entire data set.

Overall, as the complexity and size of storage systems and networks increase, the problems of managing failed or worn out storage devices along with configuration of the users of the data and of the storage systems themselves multiply. Accordingly, there is a need for systems that simplify the management of storage systems, and in particular the management of data in devices that need to be replaced, while taking advantage of the flexibility and power of the SAN architecture.

SUMMARY OF THE INVENTION

The present invention provides a method and an apparatus for use in a storage network that facilitates the protection of data in, and replacement of, storage devices that are members of a non-redundant array, such as a RAID 0 array, that are about to fail before the failure happens. In a network that includes a plurality of sets of storage devices which store respective data sets, a storage device about to fail in a non-redundant set can be replaced by another storage device from another set of storage devices. In this manner, the high performance and integrity of the high priority data in the non-redundant set is maintained, and storage devices that are about to fail are migrated into lower priority storage device sets.

The method includes detecting a condition of a first particular storage device in a particular non-redundant set of storage devices. According to various embodiments, conditions which are detected are those which indicate that the first particular storage device is suffering events which make it likely to fail, or otherwise suffering from reduced performance. The conditions are detected for example, by the receipt of a signal from the storage device itself, or by the monitoring of statistics concerning the performance of the storage device. The method of the present invention further provides for selecting a second particular storage device, which can be used in place of the first particular storage device. In response to detecting the condition, the data set stored in the first particular storage device is migrated to the second particular storage device, and the second particular storage device is identified as a member of the first particular set. The first particular storage device can be gracefully removed from the network, while maintaining access to the non-redundant set of storage devices.

According to another aspect of the invention, embodiments are provided in which the method includes determining whether a spare device is available for use in the first particular set of storage devices, and if a spare device is not available, then migrating the data set to the second particular storage device.

According to one embodiment of the invention, the migrating of the data set includes transferring copies of blocks of data in the data set from the first particular storage device to the second particular storage device via an intermediate device, and the transferring includes:

(i) setting a parameter indicating the size and location of the data set stored in the first particular storage device;

(ii) generating a request to copy a block from the data set to a buffer in the intermediate device;

(iii) generating a request to transfer the block from the buffer to the second device;

(iv) setting a parameter indicating blocks from the data set stored in the second device; and (v) repeating the acts (ii) through (iv), until a copy of the data set is stored in the second device.

In one embodiment of the invention, the method includes fulfilling the data access requests through the intermediate device.

In another embodiment of the method, the step of migrating the data set comprises a background process executed without blocking data access requests from the client.

In one embodiment, an intermediate device for the storage network is provided. The intermediate device comprises a plurality of communication interfaces, adapted for communication with a plurality of sets of storage devices storing a corresponding plurality of data sets, and for communication with one or more clients issuing data access requests for access to the plurality of data sets. Data transfer resources are coupled to the plurality of communication interfaces, and transfer data access requests identifying a particular data set among the plurality of communication interfaces. A logic engine is provided which identifies members of the plurality of sets of storage devices, and in response to detection of a condition of a first particular storage device in a first particular set of storage devices, migrates the data set stored in the first particular storage device to a second particular storage device, and thereafter identifies the second particular storage device as a member of the first particular set of storage devices.

According to various embodiments of the invention, the logic engine comprises data structures that store information, such as status information, information identifying the data set, and other data concerning the transfer. In one embodiment, the intermediate device stores a parameter indicating an extent of the data set which is already copied to the second storage device.

According to other aspects of the invention, the data transfer resources include logic operable during the transfer of the data set which direct data access requests to the first and second particular storage devices in response to a type of data access request, and a status of the transfer. In one embodiment, when the data access request comprises a request to write data in the data set, the data transfer resources direct the data access request to both the first and second storage devices if the request identifies data already copied to the second device. In another embodiment, when the data access request comprises a request to read data in the data set, the data transfer resources include logic to direct the data access request to one or both of the first and second storage devices.

According to other embodiments of the invention, the data transfer resources comprise a plurality of driver modules, and configurable logic linking driver modules into data paths, so that data paths include respective sets of driver modules. The plurality of driver modules includes one or more hardware driver modules for management of communication interfaces, and one or more internal driver modules to perform data path tasks independently of the plurality of communication interfaces.

According to yet another embodiment, the present invention provides a storage server having sophisticated data processing resources for the purposes of controlling the routing of data storage transactions, and the migration of data sets among a pool of storage devices. The data processing resources comprise a plurality of driver modules and configurable logic linking driver modules into data paths. Each configured data path acts as a virtual circuit that includes a set of driver modules selected from the plurality of driver modules. A data storage transaction which is received at a communication interface is mapped to one of the configured data paths according to the initiating host and according to the logical address of the storage extent subject of the transaction. Upon completion of a process used to migrate the data set as described above, the configuration of the data path is changed to direct the session including the transaction to the new location of the data.

The data paths configured in this manner act as virtual storage devices, facilitating the reassignment of physical storage devices among data sets according to a priority. Users of the data communicate with a communication interface on the storage server according to a protocol for a particular storage device. Inside the server, the transactions according to that protocol are mapped to a virtual storage device implemented by sets of drivers. Setting up and changing the storage tasks performed in a particular data path, and setting up and changing the mapping of a storage extent from one data path to another, and assigning storage devices to sets of storage devices are accomplished by configuring the sets of driver modules within the storage server.

The present invention provides an intelligent storage routing device which manages logical and physical access to a pool of shared storage devices, reassignment of physical storage according to data priority, and transfer of data sets among the storage devices without blocking access to the data sets. The device is logically closer to the client server than to the storage devices, and responds to client specific requests for storage transactions which require accessing and sharing a storage area network coupled to the device. The device manages the use of a cache memory to enhance performance. Very large data sets, on the order of many terabytes in size or more, can be transferred from old to new storage devices, or vice versa, as the storage resources in a network change, without blocking access to the data sets.

Other aspects and advantages of the present invention can be seen upon review of the figures, the detailed description and the claims which follow.

BRIEF DESCRIPTION OF THE FIGURES

FIG. 18 is a diagram of an internal service module implementing a persistent table store manager according to the present invention.

FIG. 19 illustrates schematically a persistent storage hardware driver module according to the present invention.

DETAILED DESCRIPTION

Figure 1:
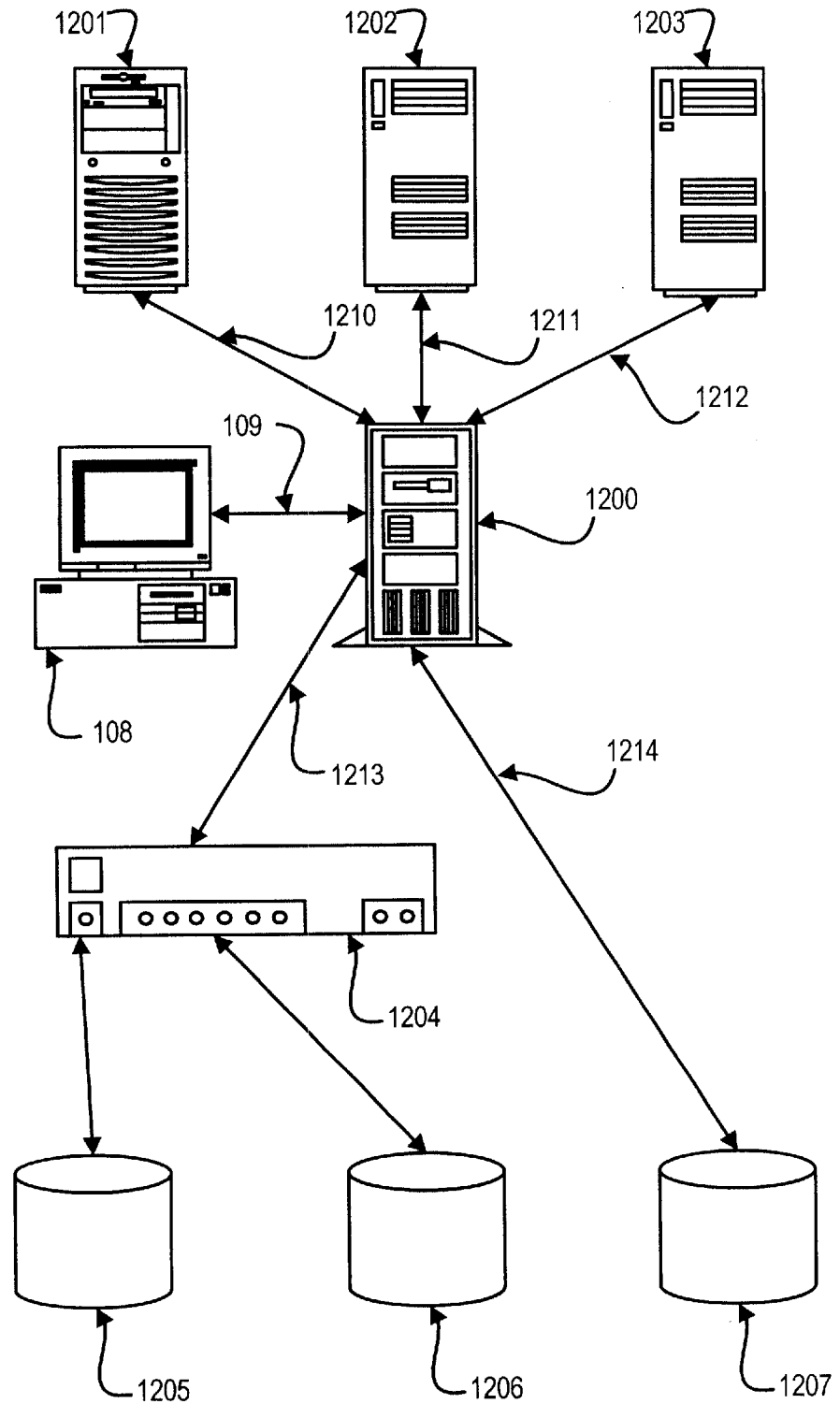
FIG. 1 illustrates a storage area network having a storage server according to the present invention configured as a storage router or a storage director.

FIG. 1 illustrates a network including intelligent storage area network (ISAN) server 1200 providing storage domain management. A storage area network (SAN) can be used to provide data storage services for client computers. A storage area network is optimized to provide high bandwidth and high throughput storage for client computers such as file servers, web servers and end user computers. A storage server 1200, according to the present invention, in preferred embodiments provides on-chassis data storage, storage transaction cache service, storage routing and virtual device management.

The storage server 1200 in the network has client interfaces 1210, 1211, 1212 coupled to client servers 1201, 1202, and 1203 respectively. Storage interfaces 1213 and 1214 are coupled via communication channels to storage devices 1205, 1206, 1207. The communication channel 1213 in this example is connected through a hub 1204 to the devices 1205 and 1206. In operation, the client interfaces operate according to protocol by which the client servers request storage transactions by commands which carry parameters sufficient for storage domain identification, including for example an identifier of an initiator, a logical extent such as a LUN number, and an identifier of a target device. The storage server 1200 maps in the requested transaction to a virtual device. The storage server 1200 in turn emulates the target physical device identified in the request virtual devices by allocating physical storage across multiple physical storage devices used to hold data according to a non-redundant striping scheme (or other comparable performance enhancing schemes) such as that defined as "RAID 0". RAID 0 is well known in the relevant arts. For examples, see publications by the RAID Advisory Board, also known as RAB Inc., a non-profit industry group. The storage server 1200 is able to direct storage transactions using local configuration data, and simplify the management of storage for the client servers.

To provide the highest throughput, the storage server 1200 is coupled to the client servers 1201–1203 by high speed network media, such as a fibre channel or gigabit Ethernet. The client servers 1201–1203 are coupled in typical configurations to end user computers by network links.

FIG. 1 illustrates a management interface 108 coupled to storage server 1200 via communication link 109. The communication link, served by interfaces in the interface 108 and in the server 1200, comprises for example, an Ethernet network link, a serial cable coupled to serial ports, or an internal bus interface in various embodiments.

Communication between the client servers 1201–1203 and the storage devices 1205–1207 is provided via a fibre channel arbitrated loop network (FC-AL) through the storage server 1200 as an intermediate device. The channels over the FC-AL can be accomplished using a protocol compliant with the American National Standards Institution (ANSI) draft standard Small Computer System Interface version 3 (SCSI-3) preferably using a fibre channel medium, also termed fibre channel protocol (FCP) (e.g., FCP X3.269-199X). In other embodiments, protocols such as the Internet Protocol (IP is defined in RFC-791 originally published by the Defense Advanced Research Projects Agency (DARPA) are used over the fibre channel fabric carrying storage transactions in a variety of protocols. In some embodiments, the storage server 1200 supports multiple protocols for the data storage transactions.

Communication among the client processors, the intermediate devices and the storage devices is provided over FC-AL links in a preferred embodiment, accomplished using a protocol according to the ANSI draft standard Small Computer System Interface version 3 (SCSI-3) preferably using a Fibre Channel medium, also termed fibre channel protocol (FCP) (e.g., FCP X3.269-199X). In other embodiments, protocols such as the Internet Protocol (IP) are used over the communication links carrying storage transactions on a variety of media and in a variety of protocols. In some embodiments, the intermediate device supports multiple protocols. Other protocols include such protocols as the High Performance Parallel Interface (HIPPI), the Intelligent Peripheral Interface (IPI) and other protocols combined with or in place of these examples. According to each of these protocols, storage transactions can be executed which identify particular target data sets within storage extents, such as using the SCSI target ID and a Logical Unit Number (LUN). Thus, in this example, a storage transaction which identifies a SCSI target ID and a LUN, can be mapped in response to the target ID and the LUN to a particular virtual circuit in the intermediate device.

Figure 2:
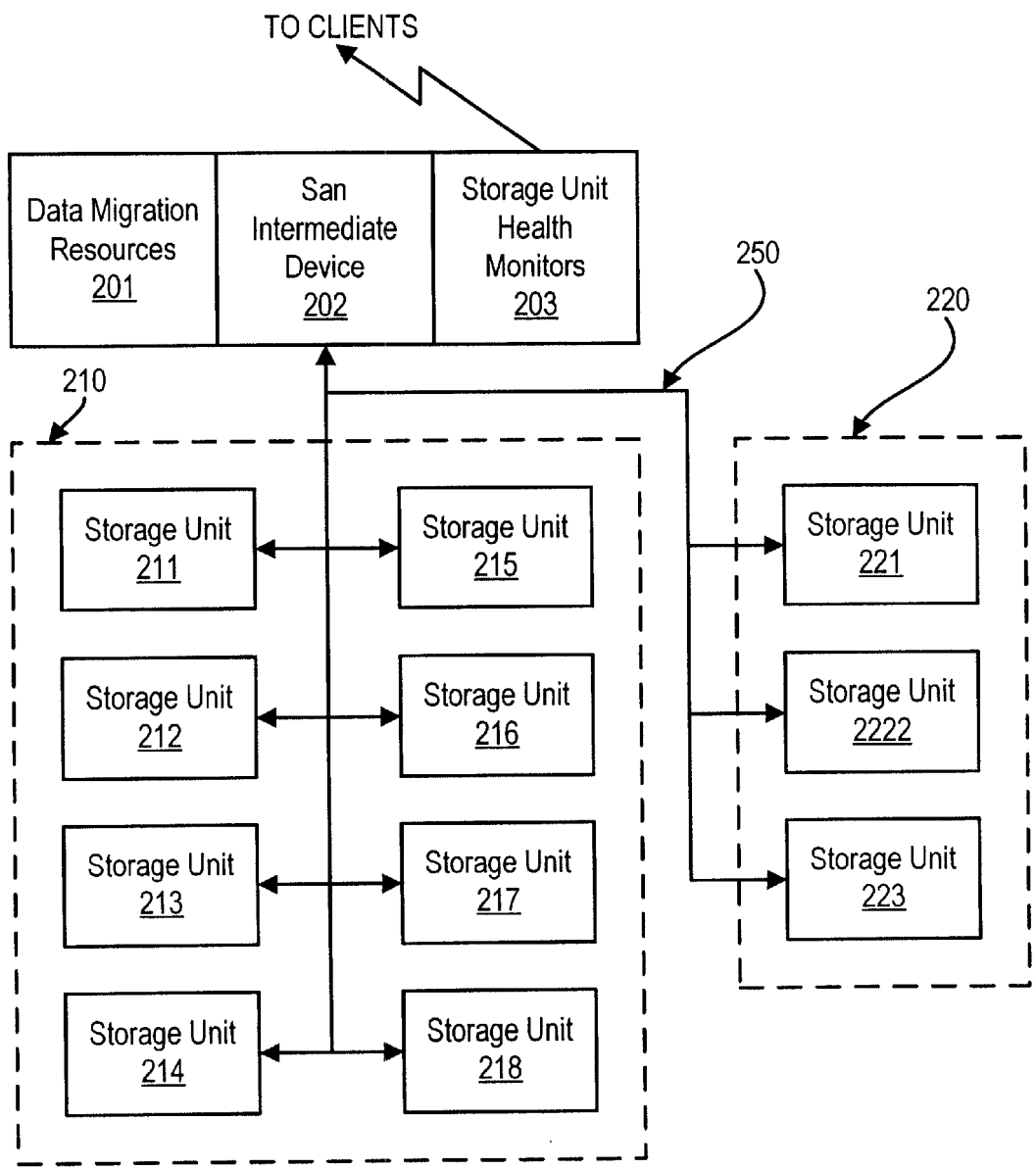
FIG. 2 is a simplified diagram of an intermediate device including the storage unit priority resources of the present invention, and coupled with a plurality of sets of storage units.

FIG. 2 is a simplified diagram showing an intermediate device 202, including storage unit health monitor resources 203, and data migration resources 201 of the present invention. The intermediate device 202 includes a plurality of communication interfaces adapted for communication with clients, such as file servers and end stations coupled to the network, and data paths 250 for communication with storage devices. The data paths 250 are shown in bus topology, but a preferred embodiment could include other network topologies such as star, ring, mesh or so on.

In FIG. 2, some of the storage devices are illustrated as belonging to a non-redundant array 210, typically using RAID 0. Eight storage devices 211, 212, 213, 214, 215, 216, 217 and 218 are shown as constituting the array 210. The number of storage devices in the array is not critical. Also shown is a pool 220 of three spare storage devices 221, 222, and 223. The size of the pool of spares is also not critical.

The capabilities of a storage unit health monitor unit 203 may be implemented in hardware, software, firmware or a mixture of these as is well known in the art. The storage unit health monitor unit 203 detects conditions of storage devices in the sets of storage devices, which may indicate a health status, using a technology such as S.M.A.R.T. mentioned above. For example, a condition may be detected by receipt of a S.M.A.R.T. signal from a monitored storage device. If, for example, the detected condition were to indicate that the storage device (usually a disk drive) is deteriorating in performance then a backup storage unit is selected from the pool 220, and the data migration resources 201 are utilized to copy the data recorded on the failing device to the newly selected backup storage device. The selection of the backup storage device may be made at any convenient time, including, prior to, after, or concurrently with, detection of the condition.

Utilization of the data migration resources is described in some detail below. In RAID 0, data striping is used and consequently no single storage device contains any complete data sets. In a typical embodiment, a single storage device holds a number of stripes (pieces) of several data sets and/or partial data sets. Provided the replacement storage device is at least as large as the data in the storage device being replaced, the data may be usefully migrated from the former to the latter. The replacement device need only be as large as the used extent of the device being replaced, assuming that allocation of used space is contiguous, or is capable of being made contiguous.

In a preferred embodiment, it is also provided for that data sets may be moved from storage unit to storage unit with only minor exigencies to data access requests by the client servers 1201, etc. Furthermore, the migration is handled by the intermediate device 202 independently of the client servers. The migration involves copying data from the device to be replaced. In this manner, if a storage unit, such as storage unit 213 in the non-redundant array were to begin to issue warnings that it might fail, a storage unit from a pool of spares, such as storage unit 222 can be removed from the pool of spares, and allocated to the non-redundant array. Furthermore, the parts of the data sets stored in the storage unit 213 are migrated to the storage unit 222 thus preempting the impending failure of storage unit 213. The troubled device 213 is typically taken off line for testing, repair and/or replacement. System administration tasks to replace or repair the device can be exercised on storage devices not included in an active array nor in a pool of spares.

Figure 3:
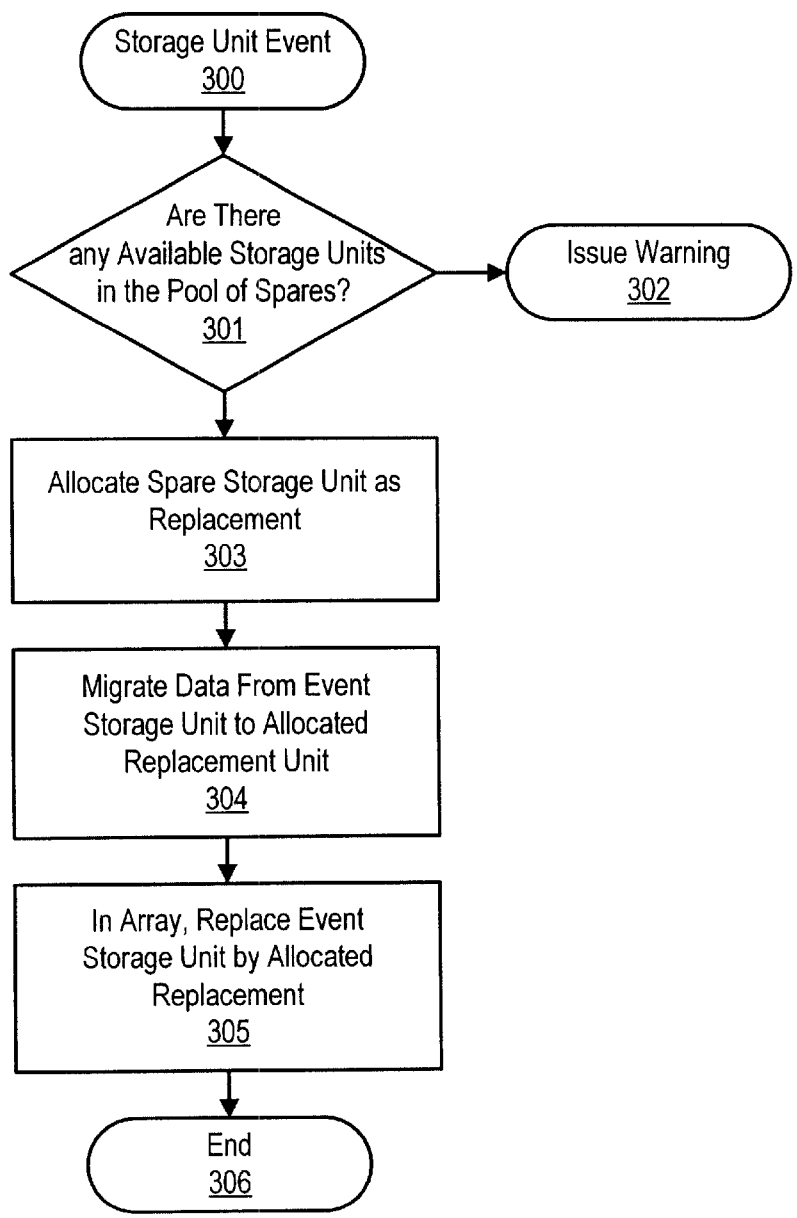
FIG. 3 provides a flow chart for the process of detecting a failing storage unit and replacing it with a storage unit from another array according to the present invention.

FIG. 3 provides a simplified flow chart of a process executed at the intermediate device according to the present invention. The process begins upon receipt of a warning about a storage unit on a particular array, such as the receipt of a S.M.A.R.T. event signal on a RAID 0 array (box 300). If the condition indicated by the warning is sufficient to invoke replacement of the storage unit, then the process determines whether a dedicated spare storage unit is available (box 301). If a spare is available, then it is allocated (box 303). The data on the storage unit causing the event is migrated to the allocated replacement unit (box 304). Appropriate tables and data structures in the intermediate device are updated to manage the use of the units. If at box 301, it is found that there were not any available spares, then a warning is issued (box 302) for further processing according to prevailing system administration rules.

In the example process of FIG. 3, decisions are made on a storage unit by storage unit basis. Because logical addressing is used in a preferred system, the storage units may comprise logical units, or physical units, or combinations of logical and physical units as suits a particular configuration of the storage system. The storage units may comprise disk drives, tape drives, Compact Disk memories, Digital Versatile Disks (DVDs), semiconductor memory storage devices, magnetic cores, bubble memory, and indeed any other type of memory system addressable using a storage network technology.

Figure 4:
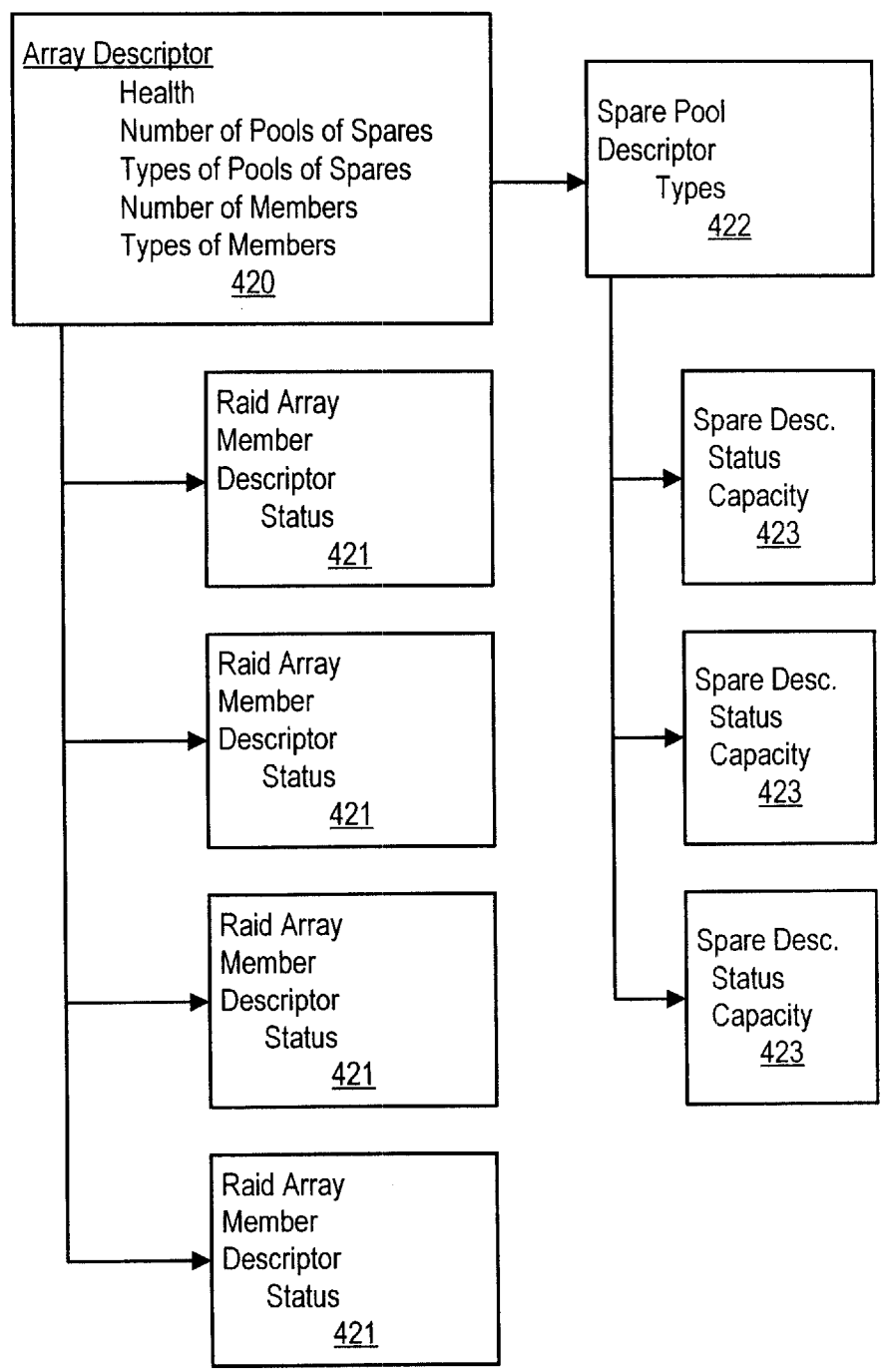
FIG. 4 illustrates simplified data structures used for support of the process of FIG. 3.

FIG. 4 is a simplified diagram of data structures that are stored in the intermediate device according to the present invention, and used for managing the allocation of storage units among the storage arrays. The data structures in this example include a RAID 0 array descriptor 420 which includes parameters that indicate the manner in which the array is configured, such as parameters that indicate the health of the devices within the array, parameters indicating the number of storage devices, and pointers to member data structures and pools of spare storage devices data structures. Thus, the data structures also include several RAID array member descriptor structures 421 which includes parameters describing the RAID array member and its status. Likewise, a RAID array spare pool descriptor data structure 422 is included indicating the types of spares and having pointers to pool member descriptor structures 423. For each spare storage device, these descriptor data structures show such parameters as: the pool or array to which the storage device is allocated, whether it is a dedicated spare, its capacity and so on. These data structures are utilized by a logic engine in the intermediate device in the process of detecting failing array members, and replacing them with spare devices as described above.

Figure 5A:
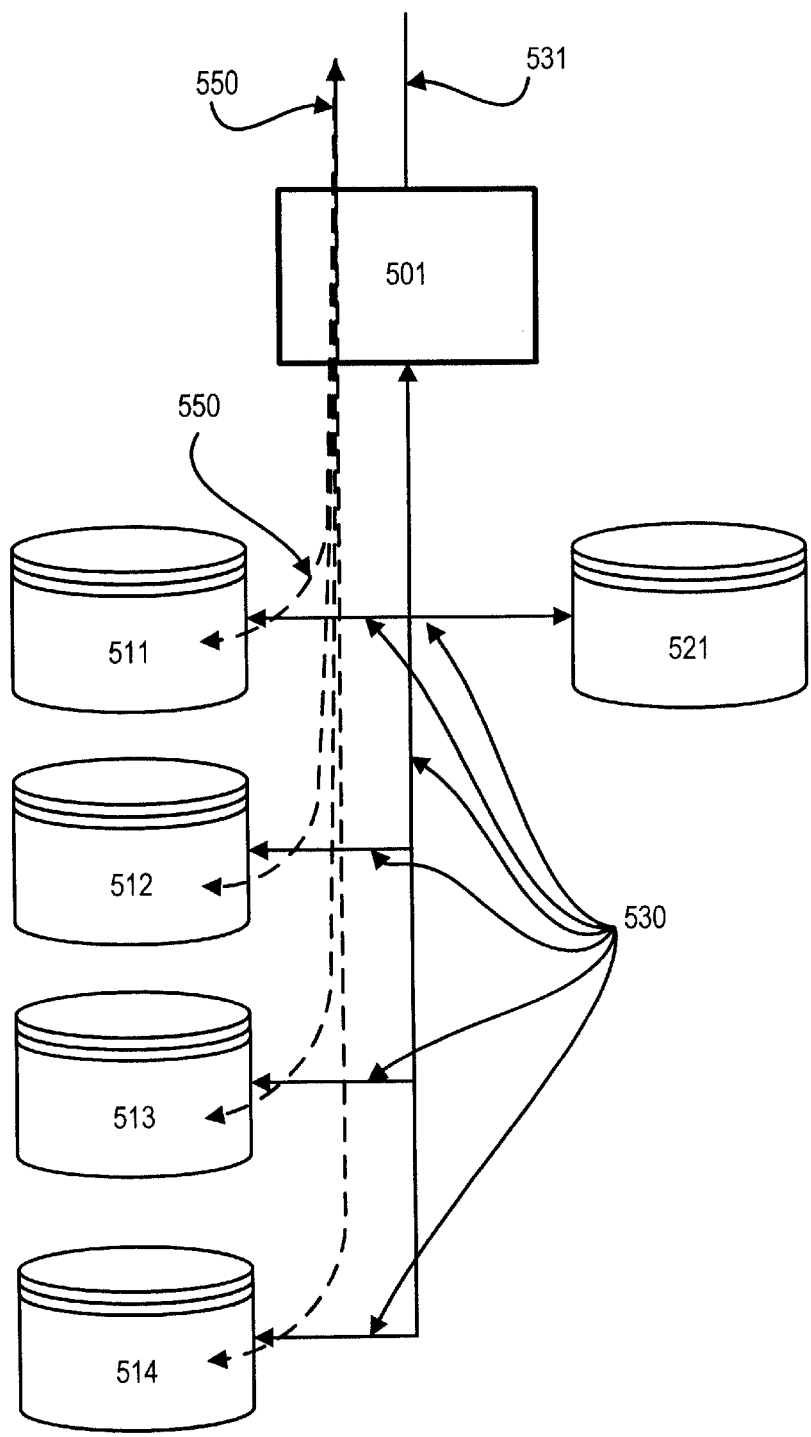
FIGS. 5A, 5B and 6 are simplified diagrams of network having an intermediate device with hot copy resources in three stages, according to the present invention.
Figure 5B:
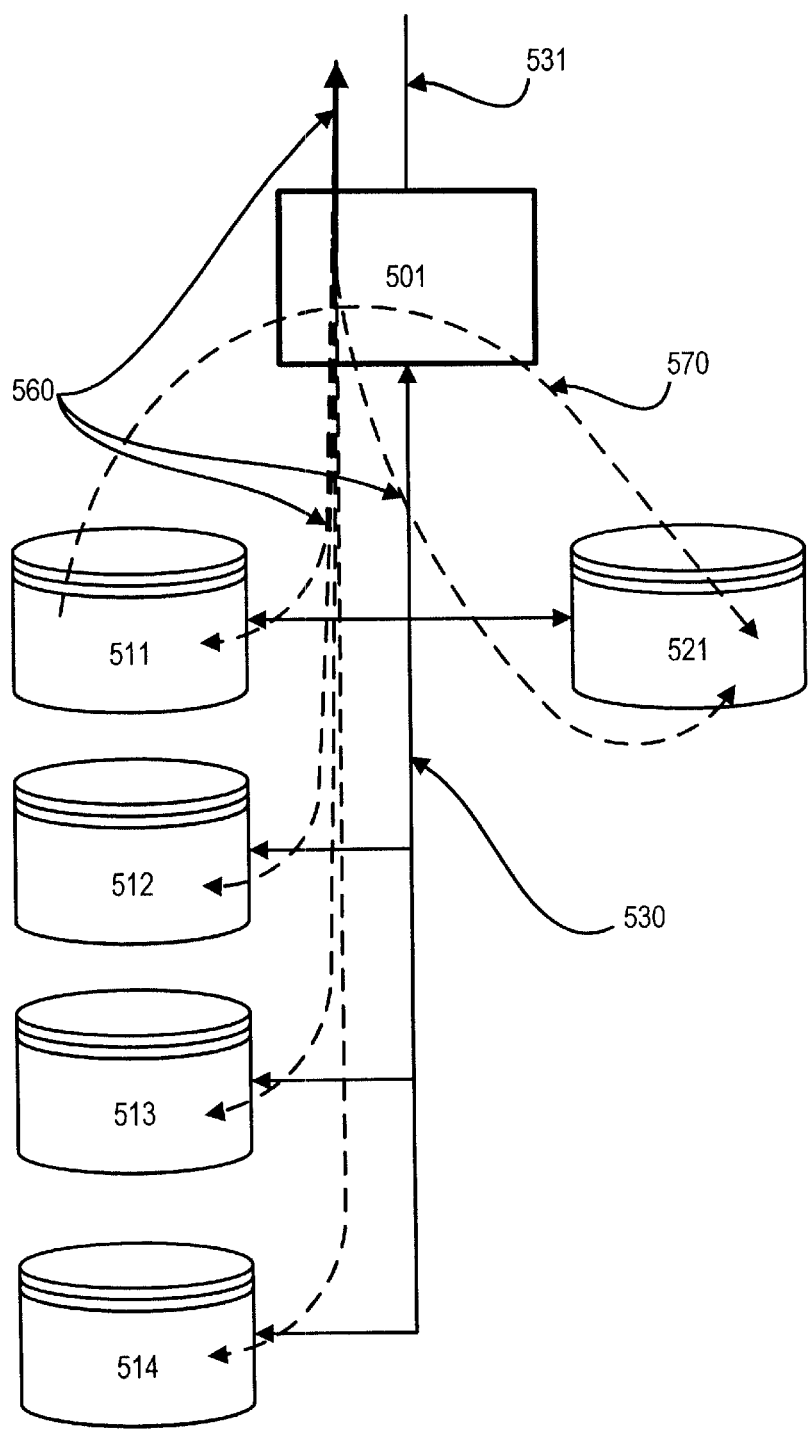
Figure 6:
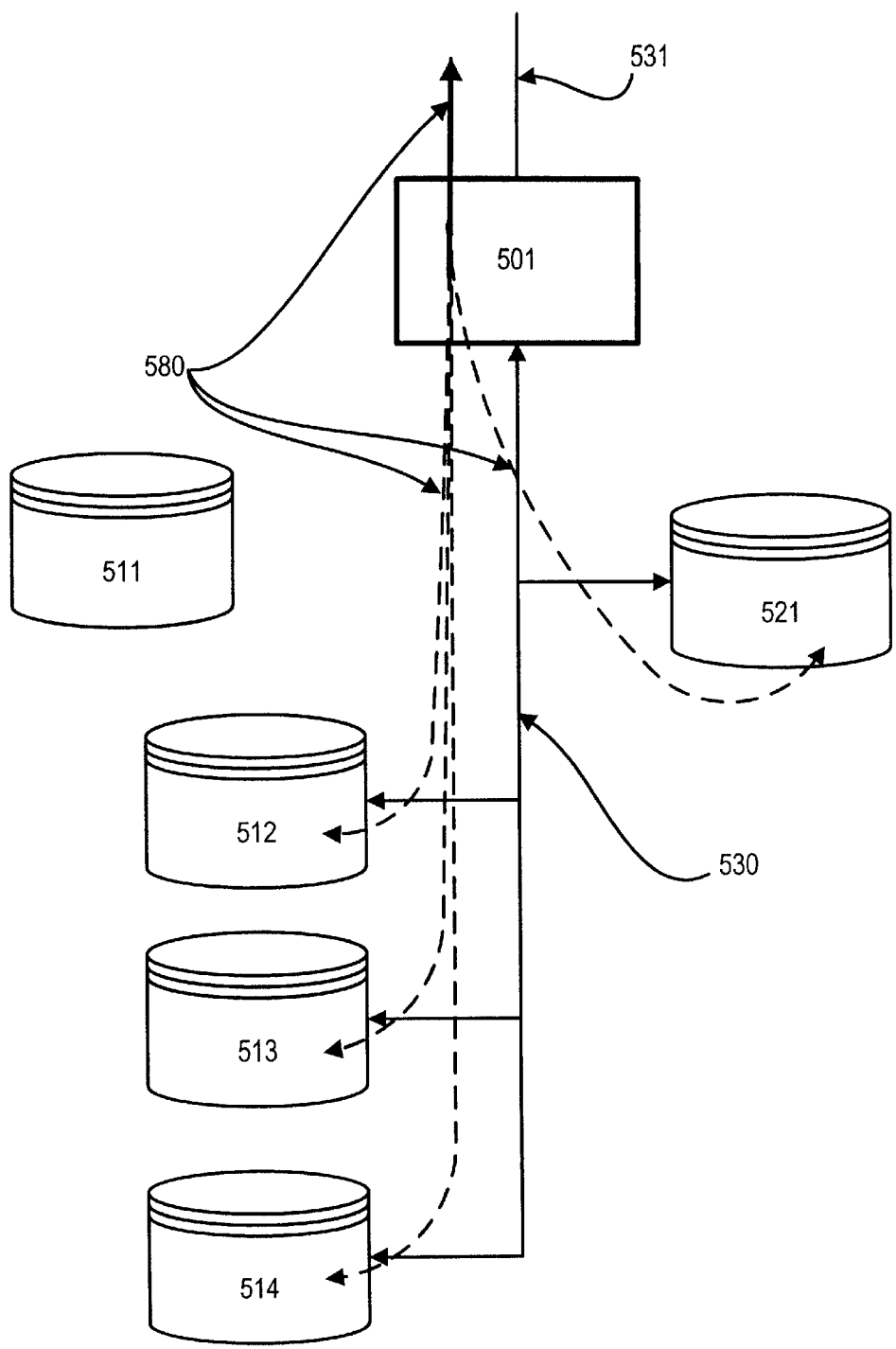

FIGS. 5A, 5B and 6 are simplified diagrams showing three stages of data flow for migration of a data set in a storage network having an intermediate device 501 coupled to a RAID 0 array 511, 512, 513, 514 and a spare storage device 521, all across communication links 530. Again, the topology of the communications link 530 is not critical except that in a preferred embodiment it would permit concurrent transfers to the storage devices in order to achieve high throughput. The intermediate device 501 is also coupled to a client processor via communication link 531, by which it receives a request for access to data at, for example, logical address LUN A (Logical Unit Number A). The intermediate device 501 includes memory for use as buffers, data transfer resources for transferring data access requests received on link 531 to the storage devices accessible across links 530. Also, the intermediate device includes a logic engine to manage hot copy processes according to the present invention. This process can be understood by considering the three stages shown in FIGS. 5A, 5B and 6.

FIG. 5A shows the first stages, i.e., prior to data migration. Thus, in Stage 1, the intermediate device 501 maps all data access requests identifying a data set within a logical storage address (LUN) and the subject of the transfer. Such requests are received via an interface to link 531. Implementing striping in accordance with RAID 0 or by similar old techniques, the intermediate device 501 translates and fragments the logical transfer request to an array of requests to the storage devices within the array. This translation and fragmentation of a logical request into multiple storage device requests is shown as the forked link 550 in FIG. 5A. The intermediate device receives a control signal initiating a hot copy process and identifying source device, in this example 511, and also identifying a target device (spare), in this example the device 521. This initiates Stage 2, shown in FIG. 5B during which the contents of storage device 511 are transferred as a background process through the intermediate device 501, into the second storage device 521. Parameters are maintained on the intermediate device 501 indicating the progress of the transfer of the data, and indicating a relative scheduling priority of the background hot copy process with respect to the data access requests from the client processors. During the hot copy process, data access requests are mapped to striped devices 512, 513 and 514, as well as to the source hot copy device 511 and/or the target hot copy device 521 depending on the process of the hot copy relative to the requested address offset within the storage devices, and upon the type of the request (especially "read" versus "write"). Also, the intermediate device includes resources for assigning a priority to the hot copy process. If the priority of the hot copy process is low, then the client processor typically does not experience significant delay in fulfillment of its data access requests. If the priority of the hot copy processes is relatively high, then the client processor may experience some delay in fulfillment of its data access requests, but the hot copy process will complete more quickly than in the former case. Line 570 indicates the logical (abstracted) data transfer path of the hot copy itself, and line 560 represents the various logical data transfer paths in the configuration during the hot copy. The locus of line 560 (in FIG. 5B) may be usefully contrasted with that of line 550 (in FIG. 5A).

Upon completion of the transfer of the data set, Stage 3 (FIG. 6) is reached. In Stage 3, the data access requests from the client processor addressed to data sets are routed to the newly constituted array consisting of storage devices 521, 512, 513, 514 across communication link 530. The storage device 511 has been removed from the network altogether (or, in an alternative embodiment, is available for other purposes). The data transfer paths in FIG. 6 are identified by reference number 580.

Referring again to FIG. 5B, the intermediate device 501 may comprise a special purpose "thin" processor designed for insertion in a network between the client processors and the first (and second devices 511, 521. In other systems, the intermediate device comprises a more sophisticated intelligent storage server. The level of intelligence and the performance of the intermediate device can be modified to meet a variety of conditions and product configurations as suits a particular need.

The storage devices 511, 521 are illustrated in FIGS. 5A, 5B and 6 as independent devices. However, the storage devices may comprise logical partitions within a single storage unit. In this case, the hot copy process results in migration of the data from one address within the storage unit to another address.

An Intelligent Storage Area Network Server

Figure 7:
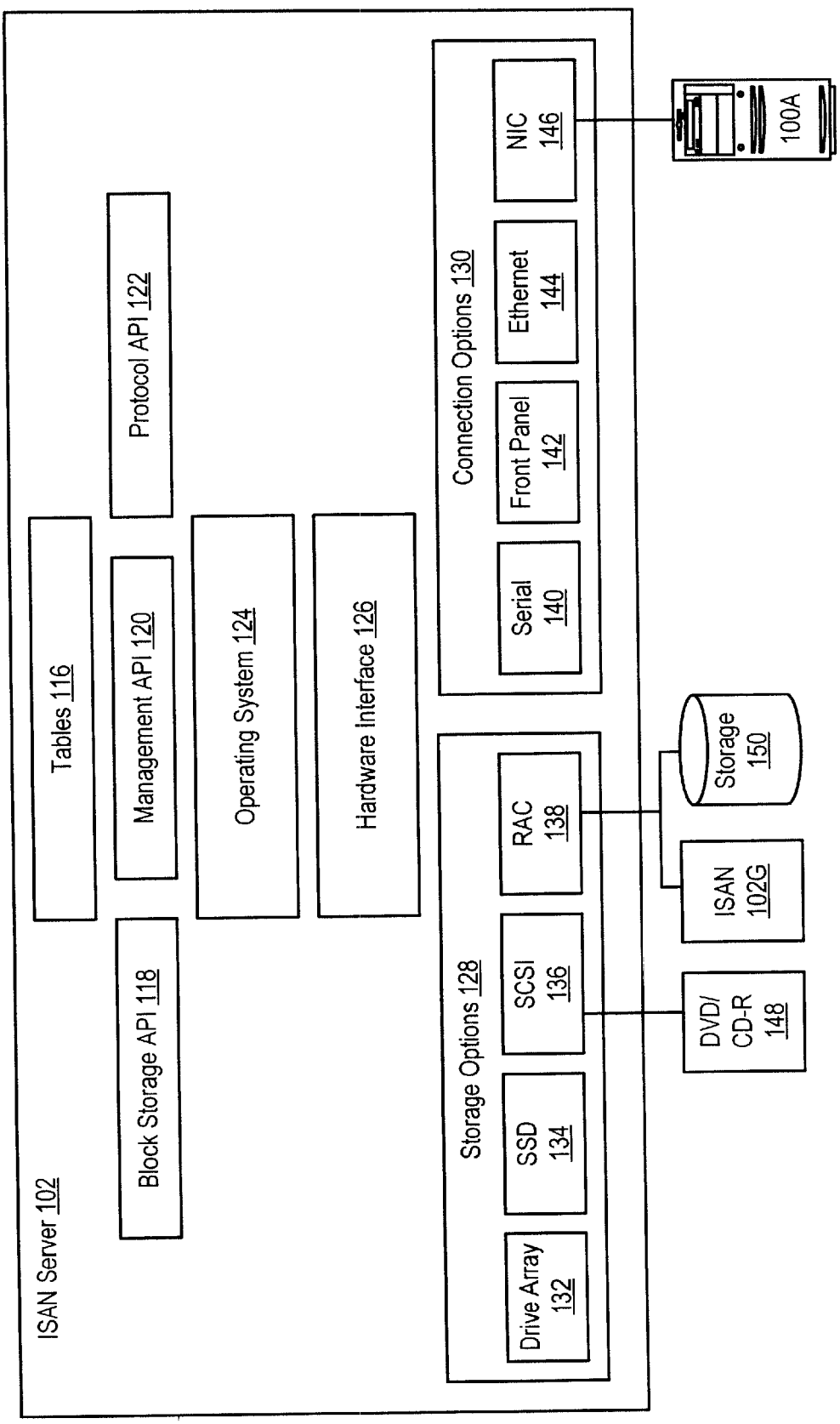
FIG. 7 is a block diagram of an intelligent storage area network server.

FIG. 7 is a block diagram of an ISAN server in one preferred embodiment, such as the ISAN server 102, or some other ISAN server configured for executing the hot copy process of the present invention.

The ISAN server 102 has connection options 130 including a set of communication interfaces adapted for users and for other data processing functions, and storage options 128 including a set of communication interfaces adapted for storage devices. The ISAN server 102 has a hardware interface 126, an operating system 124, a block storage interface 118, a management interface 120, and a protocol interface 122. The connection options 130 include serial connections 140, a front panel connection 142 supporting a configuration management routine in one embodiment, an Ethernet connection 144 supporting communication with a remote management station, and a network interface 146. The storage options 128 include the drive array 132, the semiconductor non-volatile memory array also known as solid state drive (SSD) 134, the SCSI interface 136, and the network interface 138. The SCSI interface 136 is coupled to a DVD/CD-R 148. The network interface 138 is coupled to an ISAN server 102G and/or storage 150.

The connection options 130 are various methods of connecting servers and clients to the ISAN server 102. The serial connections 140 support network management, modems for remote management, and uninterruptible power supply messages. The front panel connection 142 supports a management connection with the front panel display of the ISAN server 102. The Ethernet connection 144 supports an Ethernet interface for management protocols and possibly for data transfer. The network interface 146 is one of potentially many high speed interfaces on the server. In some embodiments, the network interface 146 is a fibre channel interface with drivers for a fibre channel arbitrated loop (FC-AL). The network interface 146 may also include drivers for SCSI-3 over the fibre channel medium using fibre channel protocol (FCP).

The hardware interface 126 provides interface specific hardware components. For example, the network interface 146 has a network interface specific set of software modules to support configuration, diagnostics, performance monitoring, and health and status monitoring.

The operating system 124, the tables 116, and the interfaces 118–122 support the virtual device and storage routing functionality of the ISAN server 102. These components of the ISAN server 102 route storage transactions among appropriate storage options 128 and the connection options 130 using configured sets of driver modules in the system.

The operating system 124 provides message routing and transport facilities in addition to fail-safe facilities. The message routing and transport facilities of the operating system 124 are used to route messages, including storage transactions, between the components of the ISAN Server 102. These messages include messages in the internal format between components of a virtual circuit. These messages can also include control messages in other formats.

The block storage interface 118 provides software modules to support block data transfers. The interface 118 includes support for striped data storage, mirrored data storage, partitioned data storage, memory cache storage, and RAID storage. The different supported storage types can be linked to form various combinations of striped arrays (especially RAID 0 but potentially including other performance-enhancing non-redundant arrays).

The protocol interface 122 provides software modules for translating and responding to requests in a variety of protocols. One set of modules is provided for the layers of an Ethernet connection: the hardware driver, the data link driver, the Internet protocol (IP) driver, the transmission control protocol (TCP) driver, the user datagram protocol (UDP) driver, and other drivers. Another set of modules provides drivers for FCP.

The management interface 120 provides software modules for managing the ISAN server 102. The management interface 120 contains interfaces for managing access to the tables 116. The management interface 120 also contains interfaces for rules based management of the system including: scheduling, or process orchestration; monitoring the system; informed consent management; and handling system processes and events. The informed consent management module is premised on providing rules based management suggestions for configuring and maintaining the ISAN server 102.

Handling Storage Transactions

Storage transactions are received over one of the connection options 130. Storage transactions include read and write requests as well as status inquiries. The requests may be block oriented.

A typical read storage transaction is comprised of the read command and addressing information. A write storage transaction is similar to the read storage transaction except the request includes information about the amount of data to be sent and is followed by the data to be written. More specifically, using the SCSI-3 protocol, each device has an identifier (ID). The machine issuing the request is called the initiator and the machine responding to the request is called the target. In this example, the server 100A is the initiator and has ID 7. In this example, the ISAN server 102 is the target and has ID 6. The SCSI-3 protocol provides for two or more addressing components, a logical unit number (LUN) and an address.

The LUN specifies a subcomponent of the target ID. For example, in a combined hard disk/tape drive enclosure, the two devices might share an ID, but have different LUNs. The third addressing component is the address where the device data is to be read from or stored to. The ISAN server 102 provides for virtual LUNs on a per initiator basis. Thus a single ISAN server 102 might support, for example, ten thousand virtual LUNs or more.

The ISAN server 102 will map the SCSI-3 storage transaction request to a virtual circuit corresponding to a virtual LUN. A virtual circuit is a sequence of one or more virtual devices. A virtual device is a composed of one or more devices such as software modules or hardware components. For example, two network interface devices could be combined to be a virtual device. Similarly, two cache devices could be combined as a virtual device. This design permits components to fail without disrupting the storage transaction processing capabilities of the ISAN server 102.

A virtual circuit comprises the necessary virtual devices to support a storage transaction. Typically, the first component in the virtual circuit is a driver for translation of the storage transaction from the storage transaction communication channel format, FCP in this example, to an internal format. One such internal format may be similar to the intelligent input and output ($I_2O$) block storage architecture (BSA) message format. The internal format is storage medium and communication channel neutral in the preferred system.

The intermediate virtual devices of a virtual circuit provide additional services, especially striping in preferred embodiments, but also such as caching, mirroring, RAID 1 and up, etc. Because the internal format is storage medium neutral, all of the intermediate virtual devices can be designed to operate on the internal format and thus interoperate with other virtual devices in the circuit.

The final virtual device in a virtual circuit is typically the format translation and the communication channel drivers for controlling the storage. For example, the drive array 132 is controlled by redundant hardware driver modules (HDMs) that are grouped to form a virtual device. The HDMs provide BSA to SCSI translation, and the HDMs handle the interface to the drives that compose the drive array 132. Similarly, if the virtual circuit is a link to some other type of storage over the network interface 138, there will be a virtual device with support for BSA translation to the storage device communication channel protocol.

The storage server also includes resources in the operating system and at the interfaces to the client servers which emulate physical storage devices. The emulation allows the virtual devices to appear to the client servers accessing the storage as if they were physical devices. Thus, the client servers can be configured to communicate using standard protocols, such as FCP using SCSI commands for storage transactions. In the embodiment utilizing SCSI commands, the emulation involves responding to an inquiry command according to the SCSI protocol with device identifiers and device capability information expected by, or compatible with, the initiating server. Also, a read capacity command and a mode page data command in the SCSI protocol are handled by the emulation resources in a manner that allows the client servers using the storage to rely on standard configuration information for physical storage devices, while the storage server spoofs the client server by emulating the physical storage devices at the interface with the client server, and maps actual storage transactions to virtual devices. The emulation resources also allow the virtual devices to be identified by the combination of an initiator, a logical unit number (LUN), and a target device identifier, without requiring the storage transaction to be tied to the specific physical target device identified in the request.

Storage Routing

The ISAN server 102 supports storage routing. For example, if the server 100A is originally coupled to the storage 150 in a SAN, the ISAN server 102 can be added to the SAN between the server 100A and the storage 150 to provide new functionality and easier administration by supporting storage routing.

In the original configuration, the server 100A provides data backup and archiving functionality. The backup and archiving functions tie up the processor of the server 100A with important but bandwidth intensive functions. In the configuration of FIG. 7, the ISAN server 102 acts as a storage router for storage transactions requested by the server 100A. The ISAN server 102 can then direct backups and archiving without tying up the server.

The ISAN server 102 provides another advantage in adding a larger storage device. For example, if storage 150 is a terabyte drive array and a new drive array that supports sixteen terabytes of storage is being brought onto the network, the ISAN server 102 can migrate the data to the new array without consuming processor time on the server 100A. Further, the mirroring drivers support intelligent read and write functionality that allow the storage 150 to be shifted to the new drive array without disrupting access to the data.

Thus, as data is moved to the new storage array, read and write requests for those portions of the data will be directed to the new array while requests for other data portions will be directed to the old storage 150. Once the migration is complete, the virtual circuit can be adjusted to remove the storage 150 from the virtual circuit.

The ISAN server 102, in one embodiment, provides a platform for cache memory which is shared among a plurality of virtual circuits.

Because a storage transaction is not linked to a data store, it is possible to change the data stores supporting a virtual circuit as storage needs change or as different storage equipment is used.

Hardware Architecture Overview

Figure 8:
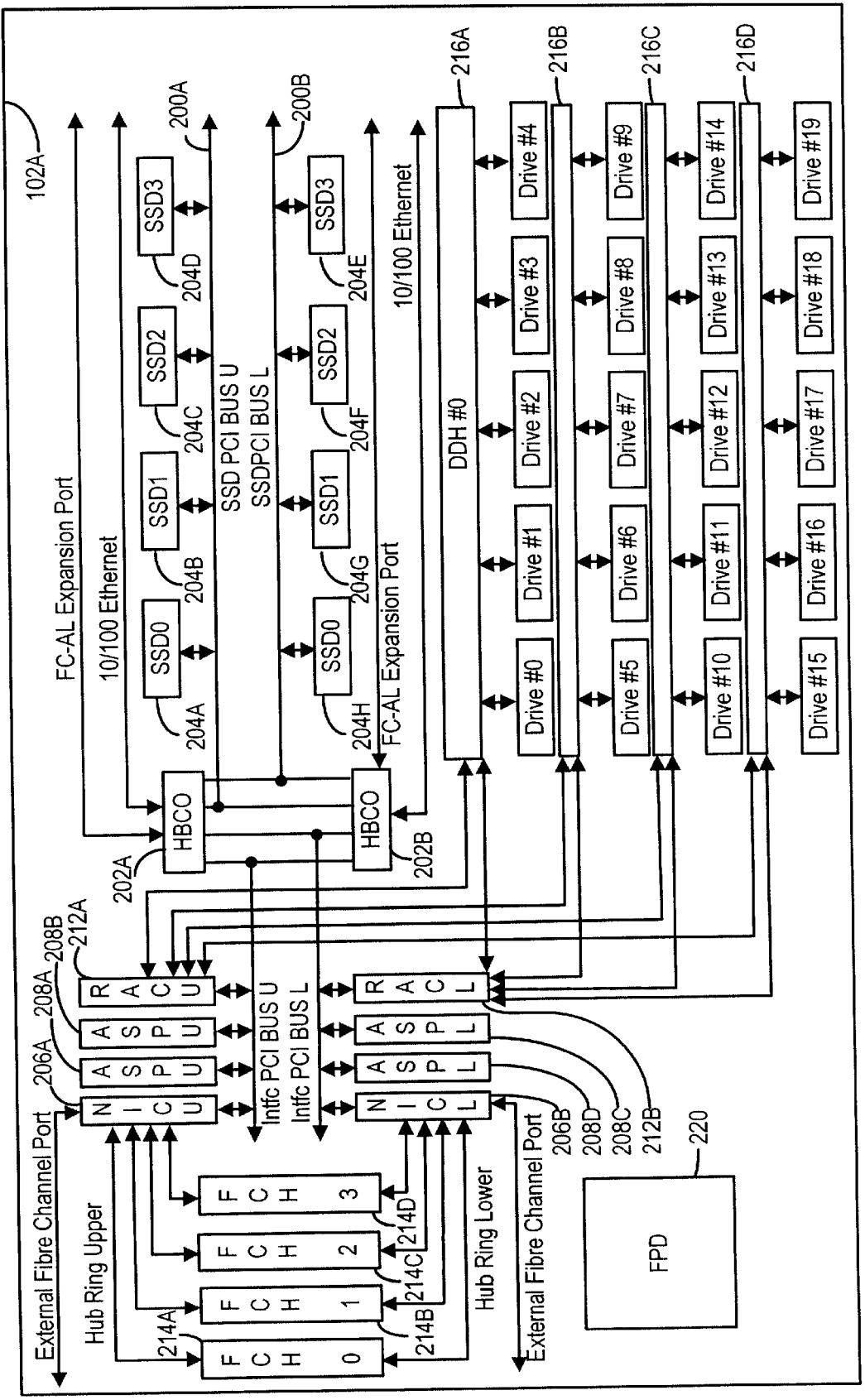
FIG. 8 is a block diagram of the hardware architecture of an intelligent storage area network server with hot copy resources.

FIG. 8 is a block diagram of one suitable hardware architecture of an intelligent storage area network (ISAN) server. The hardware architecture implements redundancy and supports distributed software systems to prevent any one single point of failure from interfering with a particular storage transaction.

FIG. 8 includes the ISAN server 102. The ISAN server is designed to provide a high degree of redundancy while using standard components and the standard based devices. For example, the ISAN server 102 uses a high speed version of the standard peripheral component interconnect (PCI) implementation and standard fibre channel arbitrated loop (FC-AL) interfaces. A variety of other protocols and interfaces can be used in other embodiments.

The ISAN server 102 has four separate 64-bit 66 MHz PCI busses 200A–D. Many different configurations of storage devices and network interfaces in the slots of the PCI busses are possible. In one embodiment, the PCI busses are divided into two groups: the SSD PCI busses 200A–B and the interface PCI busses 200C–D. Each group has two busses that are designated by the terms upper and lower. The upper and lower busses in each group can be configured to provide redundant services. For example, the lower SSD PCI bus 200B has the same configuration as the upper SSD PCI bus 200A.

The PCI busses 200A–D are connected to host bridge controller (HBC) modules 202A–B. The HBC modules 202A–B span the PCI busses 200A–D and provide redundant bridging paths.

The SSD PCI busses 200A–B support solid state drive (SSD) modules 204A–H. The SSD modules 204A–H provide solid state storage devices such as a flash memory store.

The interface PCI busses provide an interconnection from the network interface controller (NIC) modules 206A–B, the redundant arrays of independent disks (RAID) Controller (RAC) modules 212A–B, and application specific processing (ASP) modules 208A–D to the HBC modules 202A–B.

In addition to coupling the ISAN server 102 to the external FC-AL, the NICs 206A–B can be coupled to fibre channel hub (FCH) modules 214A–D. Each FCH module 214A–D is coupled to both NIC modules 206A–B. Each FCH module 214A–D provides ten FC-AL ports, and can be cascaded through the NIC modules 206A–B to provide a twenty station FC-AL hub.

The disk drive hub (DDH) modules 216A–D provide a redundant FC-AL fabric to connect disk drives to the RAC modules 212A–B. The FC-AL fabric in each of the DDH modules 216A–D comprises two redundant loops, which couple all of the drives attached to the DDH module with both RAC modules 212A–B. The RAC modules manage a loop among all of the DDH modules 216A–D. The DDH modules 216A–D each support five dual-ported disk drives such as the disk drive 218.

The system mid-plane (SMP) is not depicted in FIG. 8. The SMP is a passive mid-plane that provides the interconnections shown in FIG. 8 between the HBC module 202A–B, the SSD modules 204A–H, the RAC modules 212A–B, the NIC modules 206A–B, the FCH modules 214A–D, the DDH modules 216A–D, and the ASP modules 208A–D. The SMP is compact PCI based, with four custom compact PCI busses 200A–D, RAC-DDH interconnections, and NIC-FCH interconnections and miscellaneous control busses comprising the mid-plane signals. In addition, the SMP provides power distribution from the power subsystem, not depicted in FIG. 8, to the modules, at voltages of 48V, 12V, 5V, and 3.3V.

The front panel display (FPD) 220 provides a user interface for the ISAN server 102. The FPD contains a display device and an input device. In one embodiment, a touch sensitive liquid crystal display (LCD) is used to present a touch sensitive screen with input capabilities. The FPD 220 is coupled to the HBC modules 202A–B to support status displays, configuration display and management, and other management functions.

Power and fan subsystems, not depicted in FIG. 8, provide redundant AC to DC power supplies, redundant DC to DC power conversion, battery backup for power down, and a redundant push-pull fan subsystem. These components support the high availability and low down time features that are important when a storage area network is deployed.

The ISAN server 102 can be coupled to other ISAN servers to appear as a single network port in a storage area network or as a network attached storage device. This coupling can be done over the FC-AL expansion ports that are coupled to each of the HBC modules 202A–B. Additionally, the HBC modules 202A–B offer RS232 serial ports and 10/100 Ethernet ports for out-of-band management.

The bus system includes all of the buses in the ISAN server 102. In this example, the bus system includes the four PCI buses interconnected by the host bridge controllers. The bus system also includes the PCI buses internal to the HBC modules that provide additional interfaces. The slots include all of the positions on the bus system which can receive interfaces. In this example, each of the four PCI buses outside of the HBC modules can accommodate four interfaces.

The interfaces are the cards or other devices that are placed in the slots. The interfaces support drivers and hardware for the data stores coupled to the interfaces.

Software Architecture Overview

An ISAN server is supported by an operating system that is designed to support the uncommonly high bandwidth, high throughput, and demands of a storage server. The operating systems schedules and controls data transfers over the bus systems and manages the system. Although a number of different operating system and software component structures are possible, in one embodiment, a highly modular operating system designed for a storage server is used.

Figure 9:
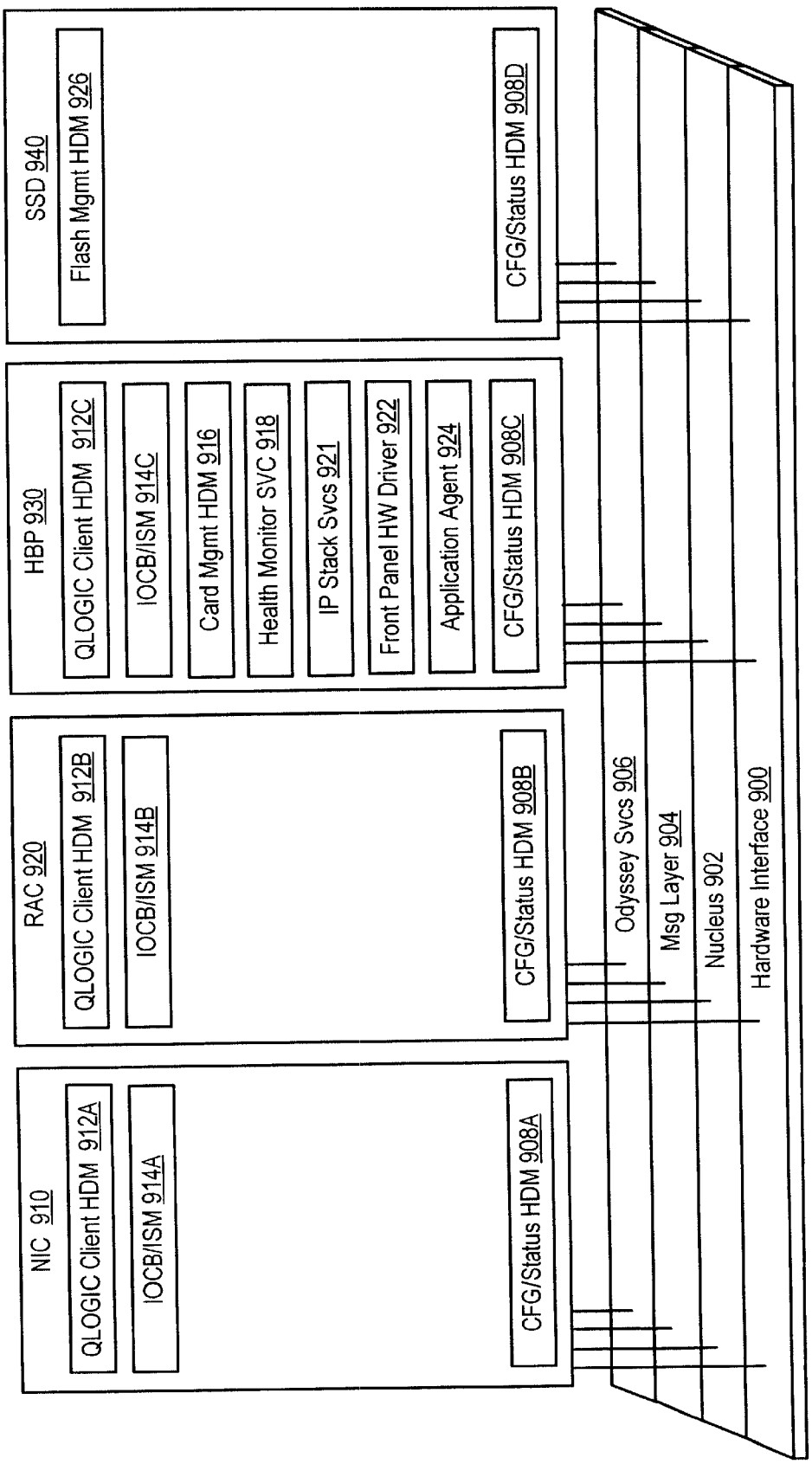
FIG. 9 is a block diagram of the software modules of an operating system and supporting programs for an intelligent storage area network server.

FIG. 9 is a block diagram of the software modules of an operating system and supporting programs for an ISAN server.

FIG. 9 includes the following operating system components: the hardware interface module 900, the NUCLEUS PLUS™ real-time kernel module 902 available from Accelerated Technologies, Inc., Mobile, Ala., the ISOS protocol management module 904, and the storage services module 906. The hardware interface module 900 allows the software components of the ISAN server to communicate with the hardware components of the ISAN server.

The NUCLEUS PLUS™ real-time kernel module 902 is used to provide basic operating system functions such as: tasks, queues, semaphores, timers, and critical section support. The NUCLEUS PLUS™ real-time kernel module 902 is exported to the software modules of the ISAN server as functions in C++ classes by the storage services module 906. C++ classes are well known in the art.

The ISOS module 904 permits the ISAN server to support a messaging architecture for input and output. The hardware modules such as the RAID controller (RAC) modules, the network interface controller (NIC) modules, the solid state drive (SSD) modules, the disk drive hub (DDH) modules, and the fibre channel hub (FCH) modules, are all input/output processors (IOPs). The master host bridge processor (HBC) module serves as the host.

The storage services module 906 implements messaging classes to support the reliable transport of messages between components. The storage services module 906 supports the operation of device driver modules and support for virtual devices. The device driver modules (DDMs) and virtual devices (VDs) are the building blocks of the ISAN server storage system. The storage services module 906 is organized around providing support for requests for storage transactions.

In some applications, a single ISAN server such as the ISAN server 102 will have several hundred DDMs operating in conjunction with the operating system modules 900–906 to support responses to storage server requests. Other applications use a few DDMs in various combinations.

Software components are implemented as device driver modules (DDMs). A DDM that primarily services requests for a hardware device is termed a hardware driver module (HDM). A DDM that serves as an internal, intermediate program is termed an intermediate service module (ISM). For example, the DDMs that service the SSD modules are termed HDMs. The DDMs that provide cache services, mirroring services, and other types of services not directly linked to a hardware device could be termed ISMs.

A single DDM can have multiple instantiations on a single ISAN server. For example, in FIG. 9, there are four instantiations of the performance, health and status PHS monitor 908A–D, one for each of the four major software subsystems: the NIC 910, the RAC 920, the HBC 930, and the SSD 940. Each DDM has its own message queue and a unique identifier. For example, the PHS monitor 908A on the NIC 910 might be device id (DID) 0. Each DDM also lists the class of storage requests handled by the DDM and the operating system modules route the requests to the DDMs based on the class of the storage request. Requests can be routed by request codes or by virtual device numbers.

The NIC software subsystem 910 includes three DDMs: a processor support HDM 912A, an input/output translation ISM 914A and the PHS monitor 908A. The RAC software subsystem 920 includes three DDMs: a processor support HDM 912B, an input/output translation ISM 914B, and a PHS monitor 908B. The HBC software subsystem 930 includes: a processor support HDM 912C, an input/output translation ISM 914C, a card management HDM 916, a system monitor DDM 918, an Internet Protocol DDM 921, a front panel display DDM 922, an application specific processor support DDM 924, and a PHS monitor 908C. The SSD software subsystem 926 includes a solid state drive management HDM 926 and a PHS monitor 908D. The front panel display 950 supports a hypertext markup language (HTML) client 928.

FIGS. 10, 11, 12, and 13 illustrate various aspects of a software implementation of a hot copy process for execution of a data migration operation in the intelligent network server described above. In other intermediate devices used for a hot copy process, variations in the implementation will be made to accommodate the particular system. More details of components of a virtual circuit, persistent table storage, and user interface structures are described with reference to FIG. 9, and the following figures.

Figure 10:
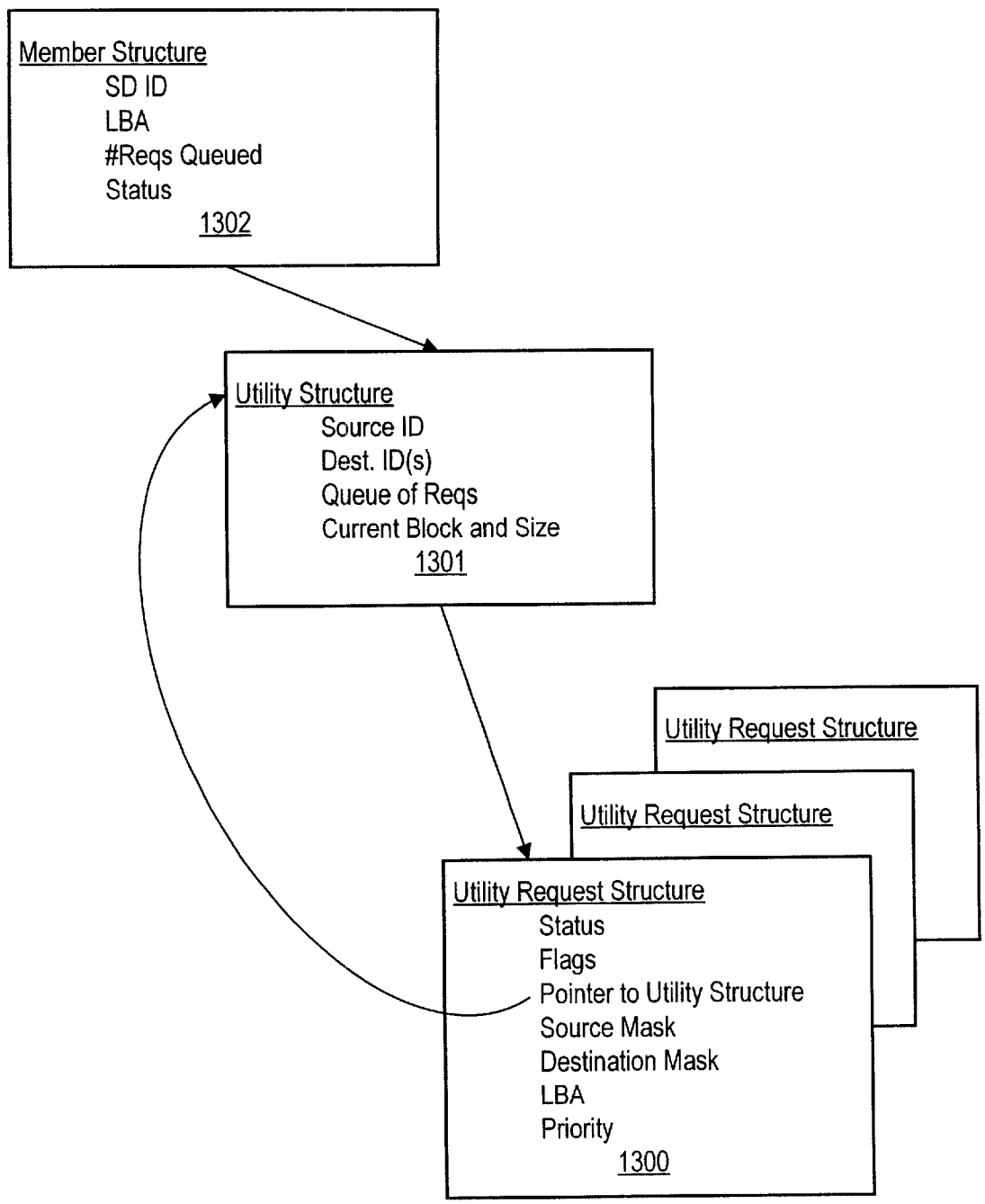
FIG. 10 illustrates data structures used in one example of a driver implementing a hot copy process according to the present invention.

FIG. 10 shows basic data structures utilized in a hot copy process. At a simplistic level, the hot copy can be thought of as a copy of the contents of source data storage device to a target storage device, rather than as a copy of the contents of one data set resident on a source storage device to a similar target. Thus, in preferred embodiments, translation from a single request upon a data set to multiple requests on particular storage devices (i.e. striping), occurs prior to any possible redirecting request(s) from one storage device to another as made necessary during hot copying (further described infra).

Referring to FIG. 10, a first structure 1300 is called a UTILITY REQUEST STRUCTURE. A second structure 1301 is called a UTILITY STRUCTURE. A third structure 1302 is called a MEMBER STRUCTURE. The MEMBER STRUCTURE 1302 is set up to identify a particular storage device and its status. The MEMBER STRUCTURE 1302 includes parameters, such as a storage device identifier (SD ID), a logical block address (LBA) holding a block number for a block of data currently being handled by the storage device, a count of requests that had been queued for the storage device, and a status parameter.

The UTILITY STRUCTURE 1301 holds parameters relevant to a present utility being executed, in this case a hot copy utility. It stores parameters such as the identifier of a source storage device (SOURCE ID), an identifier or identifiers of a destination storage device or devices for the hot copy process DESTINATION ID(s), a queue of requests QUEUE OF REQs to be executed in connection with the utility, and CURRENT BLOCK AND SIZE parameters indicating the current block being handled, and its size.

The UTILITY REQUEST STRUCTURE 1300 carries a request for the hot copy process, including a variety of parameters concerning the process. It includes for example a parameter indicating the status of the request STATUS, a variety of FLAGS supporting the request, a POINTER to a corresponding UTILITY STRUCTURE, a parameter PRIORITY indicating the priority of the request relative to input/output requests from the client processors, a SOURCE MASK identifying the source storage device, and a DESTINATION MASK identifying a location in a destination device into which the hot copy process is to copy the data. In one embodiment, there are a plurality of destination masks for a single hot copy request. Also shown in FIG. 10, a logical block address (LBA) is kept in the UTILITY REQUEST STRUCTURE, which is also kept in the MEMBER STRUCTURE, for a current block of data within the storage device being handled.

To initiate a hot copy process, user input is accepted which causes creation of the UTILITY REQUEST STRUCTURE. In alternative embodiments the hot copy process is initiated automatically in response to prevailing conditions. The persistent table storage in the storage server is updated with the structure, the status of the source and destination devices, and the virtual circuits associated with the storage device are checked, the drivers are set up to initiate the hot copy process, and the status parameters are set to particular values in various data structures. The progress of the hot copy process is maintained in the persistent table storage as a precaution to assist handling cases of failures. In case of failure, the hot copy process may be restarted using other resources within the server, using the copy of the status information and data structures that have been stored the persistent table storage. Other drivers in the system, such as RAID monitors and the like are notified of the hot copy process. The request is queued for the MEMBER STRUCTURE.

Once the set up is complete, the input and output processes in support of the hot copy process are initiated. The relative priority of the input and output processes in support of the hot copy process determines the rate of progress for the hot copy process, in the condition that a client processor is executing input and output requests for the same storage device. In the preferred system, input and output requests from the client processor are executed first. In the event that a block transfer in support of a hot copy process is being executed, when an input or output request from a client processor is received, the block transfer is completed as an atomic operation, and then the client processor request is serviced. In alternative systems, other techniques can be used to manage the priority of the processes.

Figure 11:
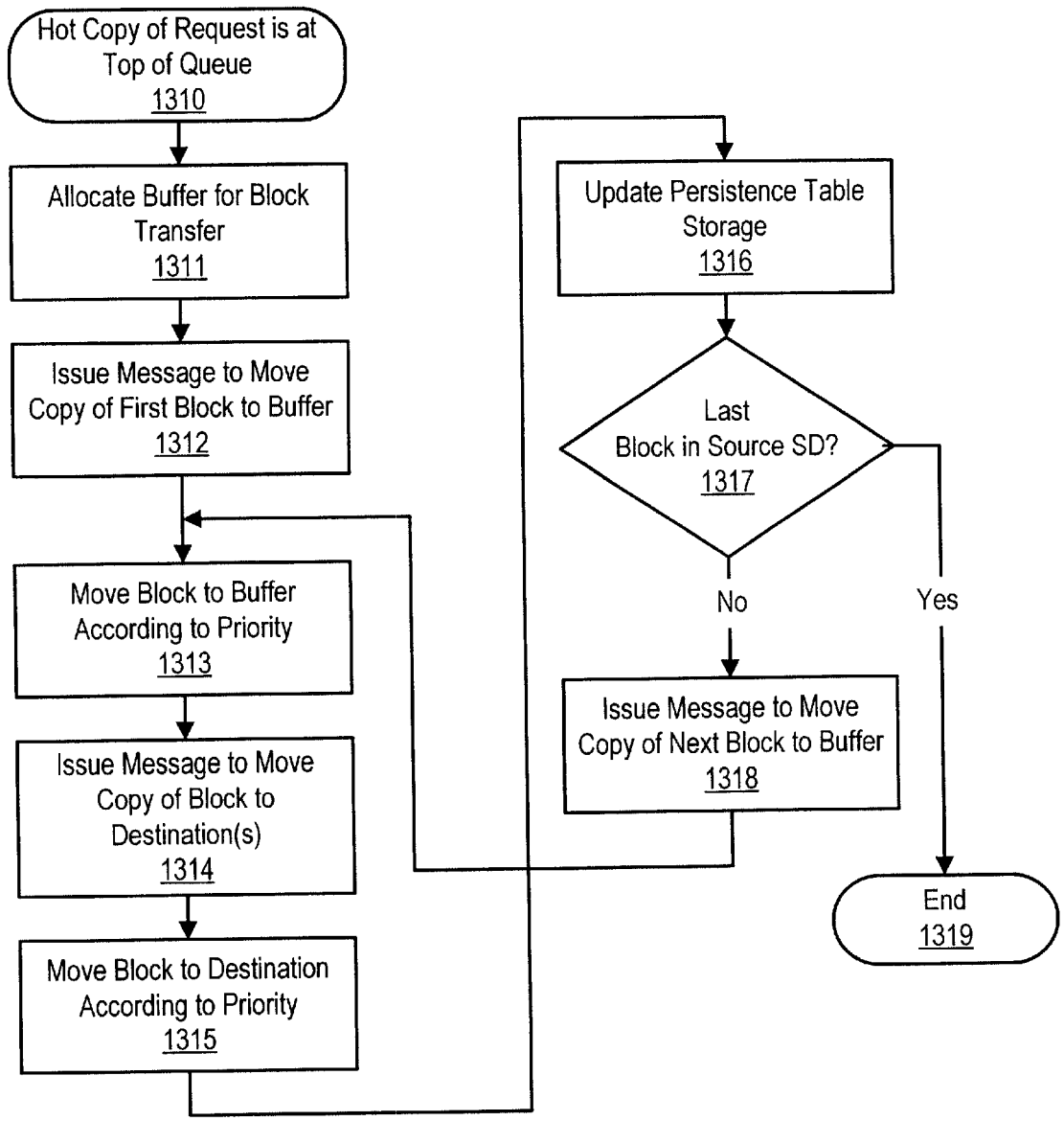
FIG. 11 is a flow chart showing a hot copy process executed by a driver according to the present invention.

The basic process for executing a hot copy is shown in FIG. 11. The process begins with a hot copy request reaching the top of the queue for the member structure (box 1310). The process allocates a buffer in the intermediate device to support the block transfer (box 1311). A message is issued to move a copy of a first block in the storage device to the buffer (box 1312). A current block is moved to the buffer according to the priority set for the hot copy process (box 1313). The movement of the block is accomplished using appropriate memory lock transactions to control access by multiple processes within the intermediate device. Next, a message is issued to move a copy of the block from the buffer to the destination or destinations (box 1314). The block is moved to the destination or destinations according to the priority for the hot copy process (box 1315). Once the block is moved, the persistent table store and local data structures supporting the process are updated with status information indicating the progress of the hot copy (box 1316). The process determines whether the last block in the storage device has been copied (box 1317). If not, then a message is issued to move a copy of the next block to the buffer (box 1318). The process loops to box 1313 to continue moving copies of blocks of data in the storage device into the destination or destinations. If at box 1317, it is determined that the last block in the storage device had been successfully moved to the destination or destinations, then the process is complete (box 1319). In alternative embodiments, copying may stop when the highest used block of the storage device is reached, rather than the last physical or last logical block is reached.

According to one embodiment of the present invention, for a hot copy process involving multiple destination storage devices, it is possible that a member or members of the group of destinations being used will fail during the process. In this case, the process can continue with the destination or destinations that continue to operate, updating the appropriate tables in support of the continued process.

Thus, a hot copy feature is used to copy a data set from one individual storage device that is suspected of being predisposed to failure to a replacement storage device (typically disk drive). The hot copy feature can be used in combination with RAID arrays of level one and above, with appropriate status and parameter management.

Hot copy parameters include the priority of process, the source member device, and a destination identifier. A hot copy request contains the source member identifier, the destination member identifier, the copy block size, and the copy frequency or priority. Hot copies are done according to the priority, and one block size at a time. The current block position is kept in array configuration data within data structures as discussed above. The hot copy process is done simultaneously with normal input and output processes. Writes to the drive being hot copied are typically written to both drives. Consequently, should the hot copy be aborted or fail, the original source storage device remains valid. When a hot copy completes, the original source storage device is typically removed from the array and designated as not usable by system manager programs. Likewise, in one embodiment, the virtual device supporting the storage device is updated to reference the new destination address.

Figure 12:
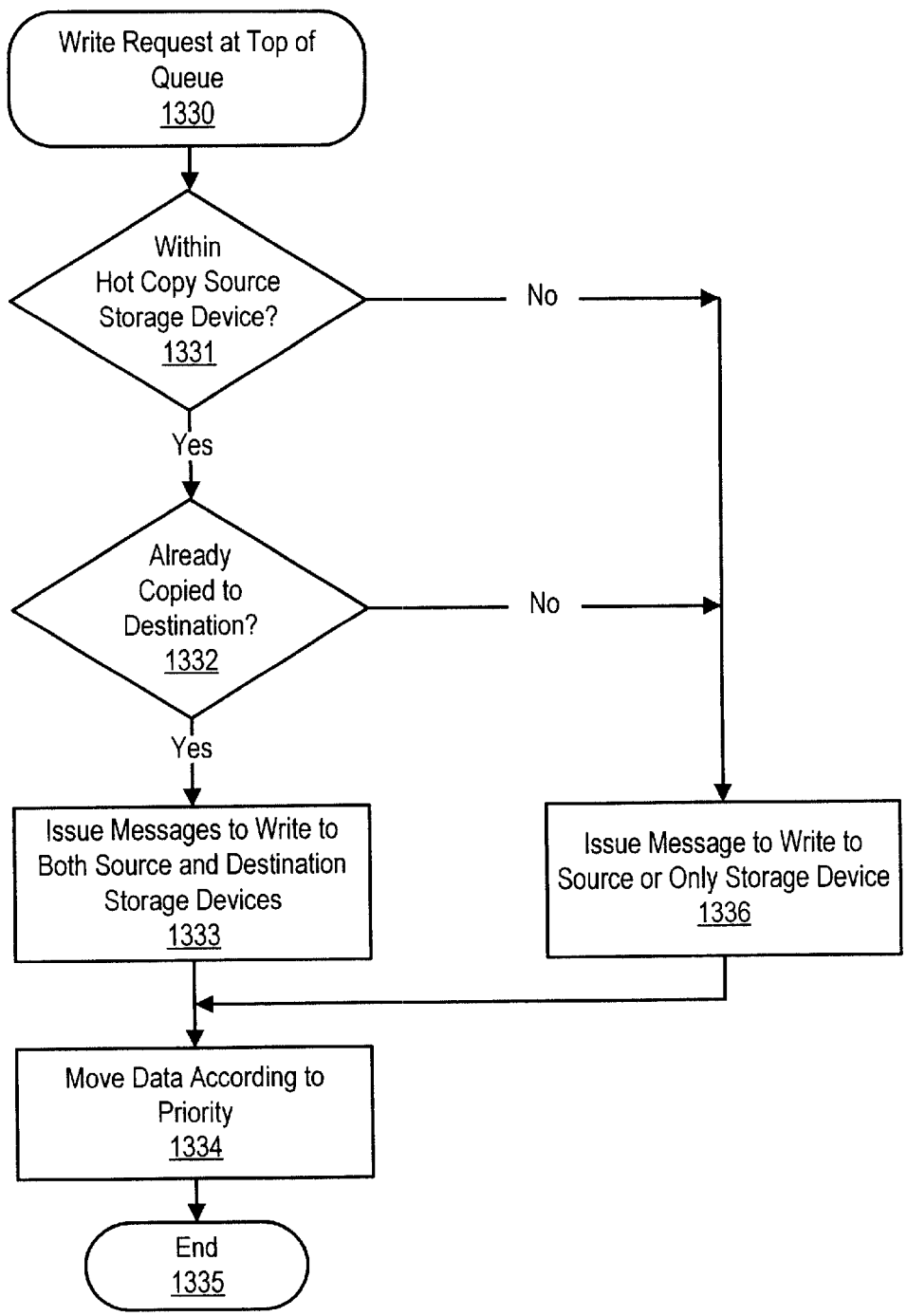
FIG. 12 is a flow chart illustrating handling of a write request during a hot copy process.
Figure 13:
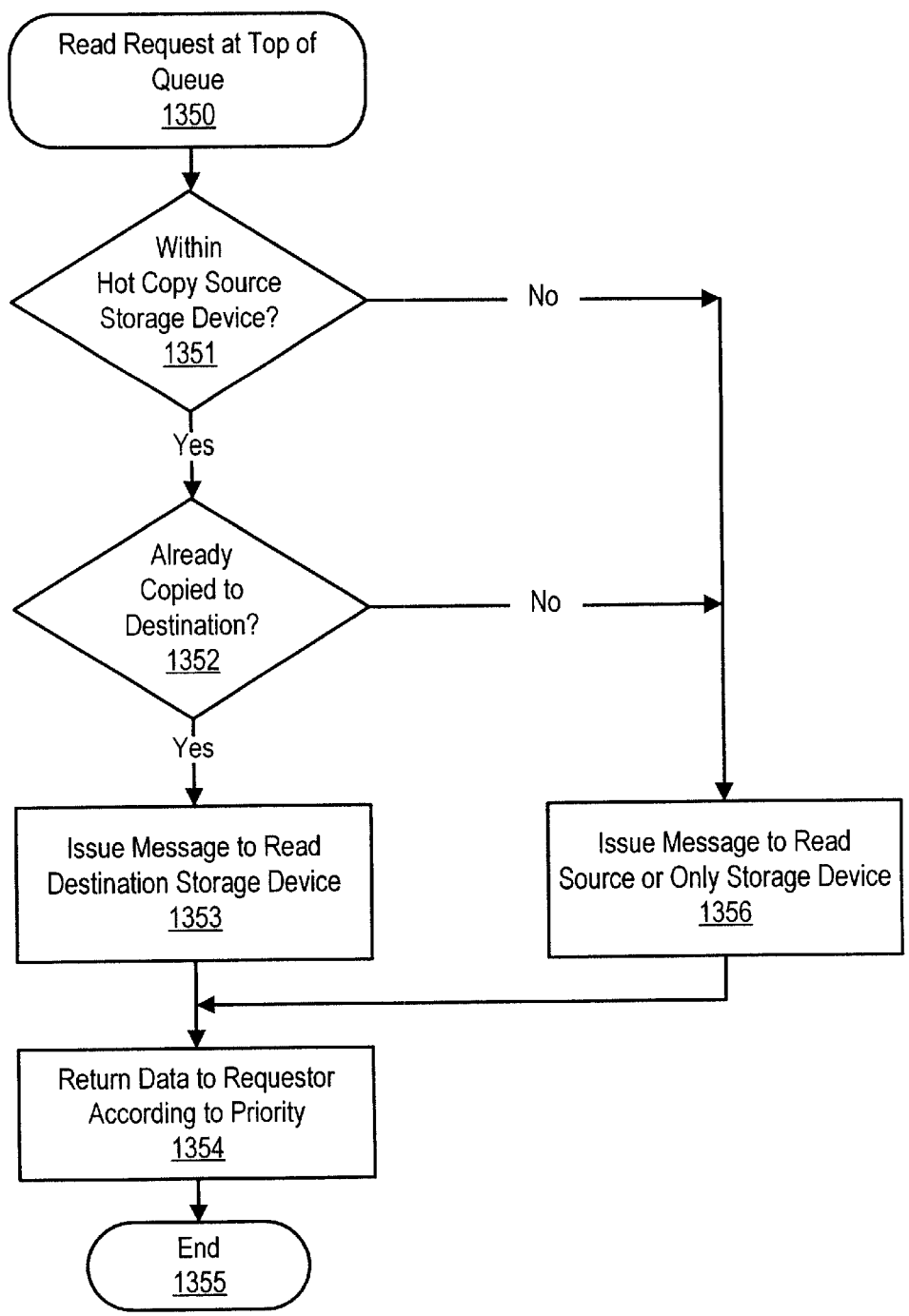
FIG. 13 is a flow chart illustrating handling of a read request during a hot copy process.

FIGS. 12 and 13 illustrate processes executed in the intermediate device to manage data access requests issued by client processors while a hot copy process is being executed. The data access requests may be one several of types, including read requests and write requests, and variations of the same. Other types of requests include requests supporting management of the data channel, and the like. The requests for transactions upon data sets are converted by a one-to-many mapping to requests upon storage devices in accordance with the well known practices of RAID 0 (not shown) and/or roughly equivalent other non-redundant array mechanisms. Other types requests include requests supporting management of the data channel, and the like.

In FIG. 12, one process for handling a translated write request to a storage device is illustrated. When a write request to a storage device reaches the top of the queue, the process begins (box 1330). The process determines whether the write request identifies a location within the storage device subject of a current hot copy process (box 1331). If it is addressed to a storage device being hot copied, then the process determines whether the block within which the write request is directed has already been copied to the destination (box 1332). If it has already been copied, then a message is issued to write both to the storage device in which the data was originally held and to the destination storage device or devices (box 1333). Next the data is moved according to the priority for the input and output request (box 1334), and the process is complete (box 1335).

If at box 1331, the request was not within the storage device, then the message is issued to execute the write to the (only) storage device (box 1336). The process flow moves to box 1334 at this point. Likewise, if at box 1332, it is found that the location subject of the write had not already been copied, then the message is issued to write to the source device (box 1336).

FIG. 13 illustrates the handling of a translated read request to a storage device that occurs during a hot copy. The process begins when the read request reaches the top of the queue for the device (box 1350). The process first determines whether the read falls within the storage device subject of the hot copy (box 1351). If the read falls within the storage device, then the process determines whether the read falls within a block already copied to the destination or destinations (box 1352). If the read is found within a block already copied to the destination, then a message is issued to read the data from the new location (box 1353). In an alternative system, the read may be executed from the source device, or from both the source and the destination devices, depending on the reliability, speed, and other factors affecting management of the data traffic within the system. After box 1353, the data is returned to the requestor according to the priority for the client processor data access request (box 1354). Then, the process is completed (box 1355).

If at box 1351, it is determined that the read request is not within the storage device subject of the hot copy, then the message is issued to read the (only) storage device (box 1356). Likewise, if at box 1352, it is determined that the read request addresses a block not yet copied to the destination, then the message is issued to read the data from the source device (box 1356). After box 1356, control returns to box 1354.

In the event that a read or write request to data within a particular block occurs while the block is in the process of moving through the intermediate device buffer, then data lock algorithms are used to manage handling of the requests. Thus for example, if a logical block is locked in support of the hot copy process while a read or write requests is received, then the client processor will receive notification that the read or write request was refused because the data was locked. In alternative systems supporting a higher priority for the client processor, the read or write request may be allowed to continue, while the block held in the buffer in support of the hot copy is deleted, and the status of the hot copy is reset to indicate that the block has not been moved. A variety of other data lock algorithms could be utilized as needed for particular implementations.

Figure 14:
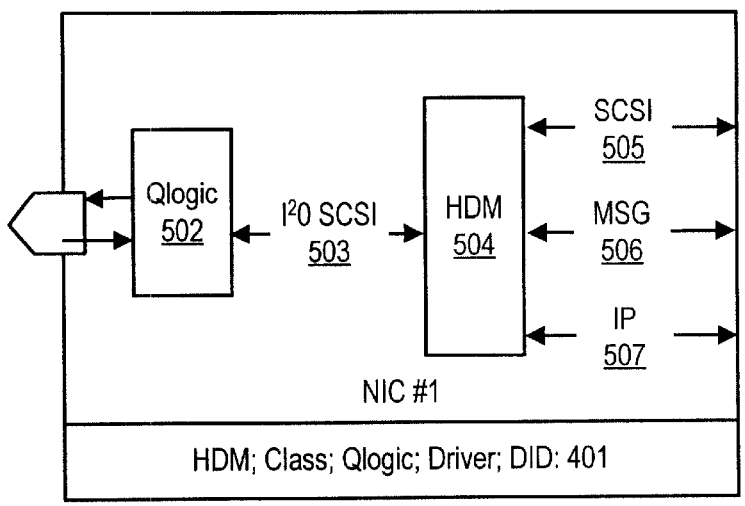
FIG. 14 is a simplified diagram of a hardware driver module for a Fibre Channel interface for use in the system of the present invention.
Figure 15:
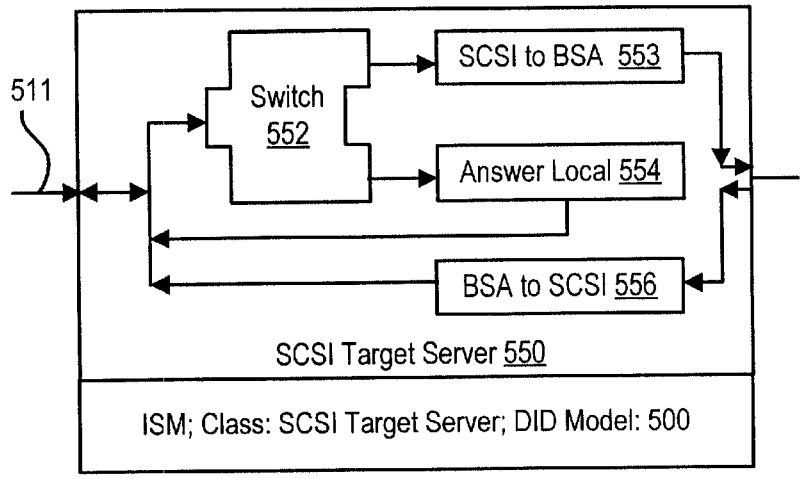
FIG. 15 is a simplified diagram of a target server internal service module according to the present invention, having a local answer capability.
Figure 16:
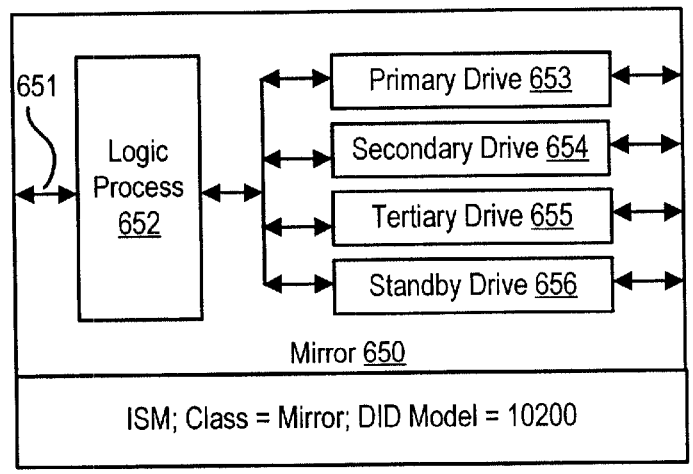
FIG. 16 is a diagram of an internal service module implementing a disk mirror.
Figure 17:
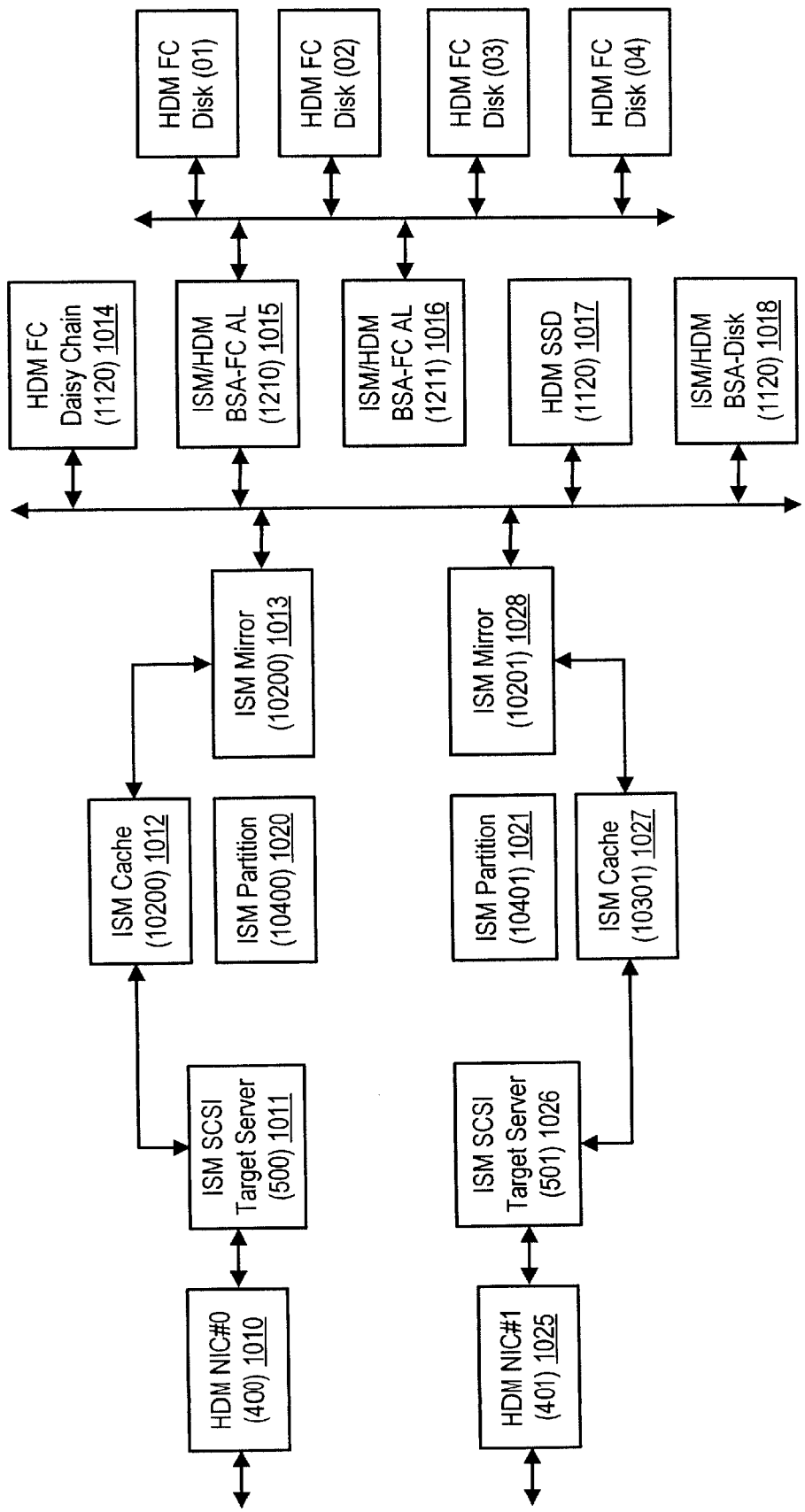
FIG. 17 illustrates a virtual circuit configuration according to the present invention.

FIG. 14 illustrates a hardware driver module HDM and FIGS. 15 and 16 illustrate internal, intermediate service modules (ISMs) according to the preferred architecture of the present invention. FIG. 17 provides a simplified diagram of a set of driver modules which have been configured into data paths acting as virtual circuits.

FIG. 14 illustrates a network interface card 500 having an HDM 504. The card 500 has a physical interface 501 to a Fibre Channel network. A network interface chip 502, in this example a Qlogic device, such as a ISP 2200A provided by Qlogic Corporation of Costa Mesa, Calif., is coupled to the physical interface 501. The network interface chip 502 generates communication represented by line 503, which is processed in the HDM 504. The HDM 504 conditions the communications for use by other driver modules in the system. Thus, communication represented by line 505 has an SCSI format. Communication represented by line 506 has a message format such as a BSA format. Communication represented by line 507 has an Internet Protocol (IP) format. The HDM is an instance of a driver class labeled "QLogic driver" in the diagram, and given device identifier DID 401 in this example. The physical interface is identified as NIC #1.

FIGS. 15–16 illustrate a variety of ISM examples according to the present invention, which can be configured into data paths.

FIG. 15 shows a SCSI target server 550, which is one example of a protocol server module according to the present invention. Similar protocol server modules can be implemented for any particular storage channel or network protocol implemented by users of the data managed through the storage server of the present invention. The target server 550 has a message interface 551 which receives incoming messages from an HDM, such as the HDM of FIG. 14, coupled to a communication interface adapted for connection with a user. In this example, the messages on interface 551 have an SCSI format. In other examples, the messages may already have the BSA architecture, or some other architecture which is suitable for the protocol on the communication interface being served. The server 550 includes a switch function 552 which translates incoming messages to a SCSI to BSA translator 553, or to an answer local function 554. Typically messages are forwarded by the translator 553 as outgoing messages on line 555. Incoming messages on line 555 are supplied to translator 556 which translates the incoming BSA messages to the SCSI format used on line 551.

In many instances, the SCSI target device can respond using the answer local service 554 to the SCSI message without routing the message further. Many status messages that do not relate to reading or writing from the storage itself are handled by the local answer service 554.

The target server 550 in this example is an instance of a class SCSI target server, and given a device identifier 500. One function of the protocol server, such as the SCSI target server 550, is to identify the storage extent which is subject of a storage transaction on the associated interface. The storage extent is mapped to a virtual circuit using the configurable logic in the storage server as described in more detail below.

FIG. 16 illustrates an ISM 650 which performs a mirror management data path task. The ISM 650 includes an interface 651 which is connected to the internal communication channels on the device. Logic processes 652 receive the incoming communications and data and manage a mirroring function. The logic 652 communicates with a plurality of drive interfaces including primary drive 653, secondary drive 654, tertiary drive 655, and standby drive 656. Although 3-way mirroring is shown in the diagram, any number of mirror paths may be implemented for "n-way" mirrors using virtual circuits. Although the drive interfaces in FIG. 16 are labeled with the term "drive," other types of storage devices can be used in the mirroring functions. The drive interfaces 653–656 communicate using the internal communication channels with the HDM modules associated with the target storage devices used in the mirroring function, or with other ISM modules as suits the particular virtual circuit. In this example, the mirror ISM 650 is implemented as an instance of a class "mirror," and given a device identifier 10200. In one embodiment, the hot copy resources of FIGS. 10–17 are coupled with a mirror management ISM.

FIG. 17 provides a heuristic diagram of redundant virtual circuits implemented by data paths including a plurality of driver modules according to present invention. Virtual circuits include an external interface for communication with a user of the data, a protocol translator for translating communications with the user into the communication format of the driver modules, and a storage object which includes a communication interface to a storage device. Storage operators which perform data path tasks can exist between the translator and the storage object. The optimal ordering of the driver modules acting as storage operators, such as cache, mirror, partition, etc., is done by the system designer using the configurable logic provided by the storage server.

In the example illustrated in FIG. 17, the external interface is provided by the NIC #0, and its associated HDM is represented by block 1010. The protocol translator is provided by the SCSI target server ISM 1011. A cache function is provided by the ISM 1012. A mirror function is provided by the ISM 1013. The storage objects are accessed from the mirror function 1013, and consist of a set of physical storage interfaces selected in this example from the Fibre Channel basic daisy chain interface and its associated HDM represented by block 1014 or an external LUN interface, the disk drives in the Fibre Channel arbitrated loop accessed through the ISM/HDM pair represented by block 1015 and the redundant block 1016, the solid state storage device and its associated HDM represented by block 1017, and the interface to an external disk drive and its associated ISM/HDM pair represented by block 1018. Separate HDM modules on each of the Fibre Channels interfaces to disks (01), (02), (03), and (04) manage the communication across the Fibre Channel arbitrated loops with the interfaces 1015 and 1016.

In the embodiment shown, the mirror module 1013 accesses disks (01), (02), and (04) as the primary, secondary and standby drives, respectively, for the mirror functions. Although the mirror module shown in FIG. 16 includes the tertiary drive interface, this tertiary drive is not used in the example system.

Also shown in the diagram are partition ISM modules 1020 and 1021, which are not connected with the data paths of the virtual circuit shown. These blocks are present to illustrate that using the virtual circuit structure, new modules, like partitioning, may be added to the path by simply configuring the storage server.

A redundant data path is implemented using the interface NIC #1 and its associated HDM represented by block 1025, the SCSI target server ISM represented by block 1026, the cache ISM represented by block 1027, and the mirror ISM represented by block 1028. Redundancy in the data storage devices is accomplished using the mirror function. The redundant driver modules are distributed in a preferred embodiment on separate IOPs within the storage server.

As illustrated in FIG. 17, each of the driver modules includes a unique driver identifier which is shown within the parentheses in the blocks of FIG. 17. The unique device identifiers are used to support the configuration logic based on tables in a configuration database managed by the storage server, and controlled by local configurable logic in the storage server.

In the preferred system, the configuration tables are managed by a persistent table driver, such as that illustrated in FIGS. 18 and 19. Referring back to FIG. 7, the ISAN server 102 stores management and routing information in tables such as the tables 116. The tables 116 can be accessed through the management interface 120. The tables 116 will typically be stored in persistent memory such as a non-volatile memory. The tables 116 can be maintained redundantly to provide fail safe support.

FIG. 18 illustrates a persistent table module 1400 which is implemented as an instance of a class "persistent table," following the basic architecture of the driver module structure. The persistent table module 1400 includes a table access logical processor 1401, and a variety of supporting functions including table data access manager 1402, persistent image manager 1403, and persistent table instance synchronization module 1404. The table data access manager 1402 is coupled with a table class manager 1405 in this embodiment. The table class manager manages a plurality of configuration tables including a Fibre Channel port ID table 1406, a LUN export table 1407, a configuration template table 1408, a DDM roll call table 1409, a virtual device table 1410, a storage roll call table 1411, a Fibre Channel disk roll call table 1412, an external LUN table 1413 and a solid state storage table 1414. The particular configuration of the set of tables managed by the persistent table module 1400 can be changed to suit the particular implementation, and optimized for certain classes of devices.

The persistent image manager 1403 and the table instance synchronization manager 1404 communicate with persistent data storage driver 1420 as illustrated in FIG. 19, and a second persistent storage driver not shown. The persistent data storage driver 1420 is implemented as an HDM, which is an instance of a class "persistent storage," and is given a device identifier following the model of the driver modules described above. In the preferred system, the persistent data storage HDM 1420 communicates with the solid state storage device in the storage server, and provides fast access to the data used in the virtual circuits.

The persistent data storage maintains a wide variety configuration information for the system. The DDM roll call table 1409 includes a list of all the instances of the device driver modules, and their unique device IDs. The storage roll call table 1411 includes a list of all the active storage devices detected by the storage server. The roll call tables can be utilized by the virtual device table 1410 and by the configuration tools to create virtual circuits. The LUN export table 1407 provides a technique for mapping the identified storage extents within a storage channel transaction to virtual circuits. The external LUN table 1413 identifies logical units of storage which are maintained in other storage servers connected through the external storage interface on the storage server.

Two primary tables support the exporting of storage to clients and the storage routing functionality of the ISAN server 102. These tables are the export table 1407 and the virtual device configuration table 1410.

The Export Table 1407

The export table 1407 maps addressing information received with a storage transaction to a virtual circuit or to a storage option. In the case of SCSI-3 over a fibre channel interface, the addressing information used is the initiator ID, the target LUN, and the target address.

It is not necessary to use all of this information to resolve each request because many LUNs can be shared across all initiators, or clients, and most LUNs will use the target address, e.g., the offset on the storage device, for addressing within the virtual circuit rather than for selecting different virtual circuits. Thus in a typical embodiment, the export table 1407 is organized as shown in Table 1.

TABLE 1

| Protocol | Protocol Specific Addressing (LUN) | Initiator Specific? if yes, ID | First virtual device in circuit | Primary connection owner |
|---|---|---|---|---|
| SCSI | 0 | No | 11 | NIC 0 |
| SCSI | 1 | Yes, ID = 6 | 30 | NIC 0 |
| SCSI | 1 | Yes, ID = 5 | 60 | NIC 1 |
| SCSI | 2 | No | 12 | NIC 0 |
| TCP/IP | Port 2000 | No | 70 | NIC 0 |

The export table 1407 may include other columns such as the current state of the virtual circuit, the capacity of the virtual circuit, and other information. In one embodiment, the export table 1407 lists the entire virtual circuit in a column of the export table.

Table 1 shows that protocol specific addressing information can be used to route the request to the appropriate virtual circuit. Therefore, only TCP sessions using port 2000 as the identifier of the target extent of storage would be routed to the virtual circuit starting with the virtual device having identifier 70.

Table 1 shows that a single LUN for a protocol can be connected to different devices depending on the initiator of the storage transaction. In this example, LUN 1 is mapped to different virtual circuits based on the initiator ID. Also, virtual circuits can be mapped based on other types of identifiers, such as the World Wide Name (WWN).

An example export table has the following structure:

```
#define EXPORT_TABLE "Export_Table"
struct ExportTable Entry {
    rowID         ridThisRow;            //rowID of this table row.
    U32           version;               //Version of Export Table record.
    U32           size;                  //Size of Export Table record in bytes.
    CTProtocolType ProtocolType;         //FCP, IP, other
    U32           CircuitNumber;         //LUN or other
    VDN           vdNext;                //First Virtual Device number in the Path
    VDN           vdLegacyBsa;           //Virtual Device number of the legacy BSA
    VDN           vdLegacyScsi;          //Virtual Device number of the legacy SCSI
    U32           ExportedLUN;           //LUN number exported
    U32           InitiatorId;           //Host ID
    U32           TargetId;              //our ID
    U32           FCInstance;            //FC Loop number
    String32      SerialNumber;          //Use a string array for Serial Number
    long long     Capacity;              //Capacity of this Virtual Circuit
    U32           FailState;
    U32           PrimaryFCTargetOwner;
    U32           SecondaryFCTargetOwner;
    CTReadyState  ReadyState;            //Current state
    CTReadyState  DesiredReadyState;     //Desired Ready State
    String16      WWNName;               //World wide Name (64 or 128-bit IEEE registered)
    String32      Name;                  //Virtual Circuit Name
#endif
```

The Virtual Device Configuration Table

The virtual device configuration table connects virtual devices with the device drivers that support the virtual device. The virtual devices are designed to support a redundant design. Therefore the table for virtual device configurations maps virtual device numbers to device modules. In one embodiment, a table such as Table 2 is used to map virtual devices to supporting device drivers. FIG. 17 illustrates the virtual circuit implemented by Table 2, starting with virtual device 12.

TABLE 2

| Virtual Device | Primary | Alternates | Parameters | Status | Class |
|---|---|---|---|---|---|
| 1 | 4000 | 4001 | N/A | Primary | Persistent Table |
| 10 | 1210 | 1211 | SO (00) | Alternate | FC Disk |
| 11 | 500 | 501 | VD (10) | Primary | SCSI Target |
| 12 | 500 | 501 | VD (13) | Primary | SCSI Target |
| 13 | 10300 | 10301 | VD (14) | Primary | Cache |
| 14 | 10200 | 10201 | VD (15, 16, null, 17) | Primary | Mirror |
| 15 | 1210 | 1211 | SO (02) | Primary | FC Disk |
| 16 | 1210 | 1211 | SO (03) | Primary | FC Disk |
| 17 | 1210 | 1211 | SO (04) | Primary | FC Disk |

As Table 2 shows, for each virtual device, information is provided about primary and alternate driver modules supporting the virtual device. For example, in the second entry in Table 2, a fibre channel disk drive is mapped to virtual device (VD) 10.

The virtual device comprises the one or more software or hardware modules for supporting the virtual device. The parameters column is used to provide initialization information. In the case of VD 10, the parameter is SO(00) which stands for storage option 0. Each device driver module class has class specific parameters. Storage option drivers use parameters specifying a particular storage unit. Intermediate driver classes such as the mirror driver and the cache driver use parameters that specify the next virtual devices in the virtual circuit. This format allows a single device driver module to support multiple devices based on the parameter setting. Notice that in Table 2, the device driver 1210 is being used by virtual devices 10, 15, 16, and 17, but each specifies a different parameter to the driver.

The status column indicates the status of the software or hardware modules supporting the virtual device. For example, in the first entry in Table 2, the status is "primary", which means that the primary device driver, 4000 here, is being used. In the second entry in Table 2, the status is "alternate", which means that the primary device driver has failed or is not responding properly. In that case, the alternate driver, 1211 for the second entry in Table 2, is used. If a device has more than one alternate, the status column will indicate the driver being used.

EXAMPLE

For example, consider a storage transaction that comes over one of the connection options 130 to the ISAN server 102 using the SCSI protocol and designating LUN 2 in the addressing information. Assume that the ISAN server 102 is configured as shown in Tables 1 and 2 for this example.

The connection option such as the network interface 146 over which the storage transaction is received is coupled to a hardware device driver. The hardware device driver receives the storage transaction and depending on the protocol, dispatches it to an appropriate virtual device for handling that protocol.

For example, SCSI storage transactions are sent to a device driver in the SCSI target class. Similarly, IP storage transactions are sent to a device driver in the IP target class. Here, the storage transaction was made using the SCSI communication protocol so it is routed to a SCSI target device driver (DID 500).

The SCSI target device driver further analyzes the request. The first part of the analysis is to determine which virtual circuit to map the request to. This determination can be made using the information in the export table. In this example, Table 1, indicates that a request using the SCSI protocol specifying LUN 2 should be routed to the virtual circuit starting with the virtual device 12. In one embodiment, all of the SCSI target requests are routed to the same SCSI target driver for a single interface. In this embodiment, the parameter information for the target VD 12 is used to control the behavior of the SCSI target device rather than routing the message to a second virtual device for a SCSI target.

The SCSI target device here, driver number 500, translates the SCSI message into an internal format. One such format is based on the 120 block storage architecture (BSA) format. This format is device and protocol neutral and can be used by the intermediate device drivers. Once the request is in internal format, it is sent to the next virtual device in the virtual circuit as indicated by the parameter field, here, the parameter is VD(13) or virtual device 13.

The message is routed to the VD 13, which provides redundant caching drivers, here, the drivers numbered 10300 and 10301. The caching driver uses a memory to cache storage transactions. Based on the caching algorithm being used by the driver, the driver will route storage transactions to the next virtual device in the virtual circuit at appropriate intervals. Here that next device is indicated by the parameter VD(14), or virtual device 14.

In the internal format, the message is routed to VD 14. The virtual device 14 includes redundant mirroring drivers. In this case, the drivers 10200 and 10201 are used. The mirroring drivers implement a mirroring algorithm for maintaining a mirrored image of storage on multiple volumes. This mirroring driver supports a primary, secondary and tertiary store as well as a standby store. Other mirroring drivers may support different algorithms. This mirroring driver also supports the coupling of a new store that is steadily brought into synchronicity with an existing store. Based on the mirroring algorithm being used by the driver and the status of the mirrored stores, the driver will route storage transactions to the appropriate virtual devices in the virtual circuit. Assuming that both the primary and alternate stores are functioning, the mirror driver will route this request to the primary and secondary stores only according to the parameter VD (15, 16, null, 17) or virtual devices 15 and 16. The null in the parameter list indicates that no tertiary drive is currently being used for this virtual device.

The mirroring driver may route the storage transaction messages in serial or in parallel to the two devices. In this example, the messaging to virtual device 15 will be considered although the example can also be extended to the second store, virtual device 16. Virtual device includes redundant drivers for controlling a fibre channel drive. The drivers translate the internal format into a format used by the drives, e.g., BSA to SCSI. The drivers also provide the addressing information to the drive. Here, the parameter SO(02) is used to select a storage option, here the fibre channel drive number 2.

Accordingly, within the storage platform, hardware functions (such as disk or flash storage) and software functions (such as RAID stripes or Mirrors) are all accessed via software drivers most commonly referred to as devices.

These devices are paired up (with each member of the pair preferably running a separate board for redundancy) and called Virtual Devices. These Virtual Devices are then chained together into various configurations. For instance, a mirror device can be chained to two or three disk devices. Through this type of configuration Virtual Device chains are constructed. These Virtual Device chains can be added to as long as they are being configured into some BSA-type device that can itself be used within yet another configuration.

Virtual Device chains are connected to a FCP/SCSI Target Server device and mapped in the FCP Target Driver's LUN export tables for "export" (i.e., to be accessible via the FCP protocol from the outside world). At that point the Virtual Device chain with a SCSI Target Server Device at its head is called a Virtual Circuit.

The Virtual Circuit Manager software responsible for creating Virtual Circuits puts the SCSI Target Server "head" onto a Virtual Device chain and then exports the Virtual Circuit by updating the FCP Target's Export Tables. The software also supports delete, quiesce and fail-over operations.

Virtual Circuit Manager software is also responsible for maintaining the Virtual Circuit Tables (VCTs) that list in a single place all the Virtual Devices in each Virtual Circuit. This information is needed to implement many system actions such as failover, hot-swap and shutdown.

When it is initialized, the Virtual Circuit Manager software defines the VCT itself in the persistent table store. Note that this is harmless if the VCT has already been defined. The Virtual Circuit Manager software also listens for insertions, deletions and any modifications to the VCT.

In order to create a new Virtual Circuit, the information necessary to instantiate a SCSI Target Server and to map and export the new LUN must be placed into a record in the VCT. The Virtual Circuit Manager listens for insertions into the VCT and upon receiving a listen reply will perform the following actions:

1. Attempt to validate the information in the newly inserted record. If the record contains invalid information, its status field is set to indicate the error and no further action is taken.
2. Create a new SCSI Target Server device for the LUN of the Virtual Circuit specified by the newly inserted record.
3. Set the status in the new record to "Instantiated".
4. The storage assigned to the Virtual Circuit will be flagged as used in a Storage Roll Call Table.
5. The Export Table will be updated to dispatch the LUN to the new SCSI Target Server.

When a record in the Virtual Circuit is deleted, the Virtual Circuit Manager will perform the following actions:

1. Quiesce the Virtual Circuit if it is not already and mark it as Quiesced.
2. Remove the Virtual Circuit's dispatch data from the Export Table.
3. Mark the Roll Call Record referenced from the Virtual Circuit Record as unused.
4. DeInstantiate the SCSI Target server associated with the Virtual Circuit.

The Virtual Circuit Manager also listens for modifications to the "Exported" field in the VCT. If the "Exported" field in any record in the VCT is set to True, then the Virtual Circuit Manager will perform the following actions:

1. Export the virtual circuit by making the necessary modifications to the FCP Target's Export Table.
2. If there is any error encountered during the Export Operation, the status field in the VC Record will be set and the "Exported" field will be left in a correct state. If the Virtual Circuit was not exported, the Exported Flag will be set to False.

The Virtual Circuit Manager listens for modifications to the "Quiesced" field in the Virtual Circuit Table. If the "Quiesced" field in any record in the VCT is set to True, then the Virtual Circuit Manager will perform the following actions:

1. If the VC is currently exported, it will be unexported and its "Exported" flag will be set to False.
2. All of the Virtual Devices in the Virtual Circuit will be sent Quiesce Messages.
3. If there is any error encountered during the Quiesce Operation, the status field in the VC record will be set and the "Quiesced" field will be left in a correct state, i.e., if the Virtual Circuit was not quiesced, the Quiesced Flag will be set to False.

The present invention is used to reduce the vulnerability of one or more high performance storage device arrays. Such arrays may be fault tolerant, though typically the costs can be prohibitive when the highest performance is sought. For arrays that are not fault tolerant or non-redundant, vulnerability is improved by replacing storage devices that are predicted to have impending failures by spares devices. This feature provides an additional level of pro-active data protection beyond the traditional protection offered by RAID arrays.

An embodiment of the invention is executed when a member of an array starts showing soft failures or intermittent hard failures and a suitable spare (dedicated or pool) can be found. Even if there are hard failures in small portions of the data, there is still an advantage in migrating the data so that further deterioration of a database can be avoided and database reconstruction needs can be kept to a minimum. The steps preferably include the following:

The storage device that is underperforming is identified. Typically modern devices can report their own degradations.

A spare is appropriated.

The appropriated member may be added to the appropriating array as a dedicated device.

A regenerate, or data migration, is automatically started when the appropriating array "sees" the new spare. This puts the new member into the virtual circuit of the array.

The underperforming device is removed from the array for testing and/or repair.

The foregoing description of various embodiments of the invention have been presented for purposes of illustration and description. The description is not intended to limit the invention to the precise forms disclosed. Many modifications and equivalent arrangements will be apparent to people skilled in the art.

What is claimed is:

1. A method for managing data in a network, the network comprising a plurality of storage devices, the method comprising:

(A) assigning a first set of storage devices to a non-redundant storage array;
(B) storing at least one data set on the array;
(C) detecting a condition of a first particular storage device comprised within the array and wherein the first particular storage device stores a subset of the at least one data set;
(D) selecting a second particular storage device;
(E) migrating, in response to said detecting, migrating the subset to the second particular storage device, the migrating including
(1) providing an intermediate device in the network, the intermediate device being coupled to the first particular storage device, the intermediate device further being coupled to the second particular storage device, the intermediate device having a buffer;
(2) transferring a plurality of copies of blocks of data from the subset to the buffer;
(3) re-transferring the plurality of copies of blocks of data from the buffer to the second particular storage device and fulfilling, via the intermediate device, a plurality of data access requests relating to data in the subset during an act selected from a list consisting of the transferring and the re-transferring the plurality of copies of blocks of data from the buffer to the second particular storage device and fulfilling, via the intermediate device, a plurality of data access requests relating to data in the subset during an act selected from a list consisting of the transferring and the re-transferring; and,
(F) identifying the second particular storage device as a member of the array.

2. The method of claim 1, wherein the non redundant storage array conforms to RAID 0.

3. The method of claim 1, wherein the detecting comprises receiving of a signal from the first particular storage device.

4. The method of claim 1, wherein the condition comprises an event indicating that the first particular storage device may fail.

5. The method of claim 1, further including:

maintaining a data structure in the intermediate device, the data structure storing a parameter, the parameter depending upon an extent of the subset, the extent having been already transferred from the first particular storage device to the intermediate device.

6. The method of claim 5, wherein:

the plurality of data access requests include a write request to write data to a location in the subset, and further including:
sending a further write request to the first particular storage device should the location be situated outside the extent.

7. The method of claim 5, wherein:

the plurality of data access requests includes a write request to write data to a location in the subset, and further including:
sending a further write request to the second particular storage device should the location be situated inside the extent.

8. The method of claim 7, further including:

sending a still further write request to the first particular first device should the location be situated inside the extent.

9. The method of claim 1, further including:

assigning a first priority for the fulfilling of the plurality of data access requests with respect to a second priority for the transferring of the plurality of copies of blocks of data.

10. The method of claim 9, wherein the first priority is higher than the second priority.

11. The method of claim 1, wherein the act of transferring and the act of re-transferring jointly include:
   (i) setting a first parameter indicating a size of the subset and further indicating a location of the subset;
   (ii) generating a request to copy a block of data from the subset to the buffer;
   (iii) generating a request to transfer the block of data from the buffer to the second particular storage device;
   (iv) setting a second parameter depending upon a cardinality of a set of blocks consisting of blocks of data copies from a location selected from a list consisting of the subset and the buffer; and
   (v) repeating the acts (ii) through (iv), until a copy of the subset is stored in the second particular storage device.

12. The method of claim 1, wherein a background process comprises at least one act selected from a list consisting of the transferring of copies of blocks of data and the re-transferring of copies of blocks of data, the background process being capable of operating concurrently with the fulfilling of the plurality of data access requests from the client.

13. A computer-readable medium having contents which cause a computer to manage data in a network, by:
   (A) assigning a first set of storage devices to a non-redundant storage array;
   (B) storing at least one data set on the array;
   (C) detecting a condition of a first particular storage device comprises within the array and wherein the first particular storage device stores a subset of the at least one data set;
   (D) selecting a second particular storage device; and
   (E) migrating, in response to said detecting, the subset to the second particular storage device, the migrating including
      (1) providing an intermediate device in the network, the intermediate device being coupled to the first particular storage device, the intermediate device further being coupled to the second particular storage device, the intermediate device having a buffer;
      (2) transferring a plurality of copies of blocks of data from the subset to the buffer; and
      (3) re-transferring the plurality of copies of blocks of data from the buffer to the second particular storage device and fulfilling, via the intermediate device, a plurality of data access requests relating to data in the subset during an act selected from a list consisting of the transferring and re-transferring; and,
   (F) identifying the second particular storage device as a member of the array.

14. The medium of claim 13, wherein the detecting comprises a receiving of a signal from the first particular storage device.

15. The medium of claim 13, wherein the condition comprises an event indicating that the first particular storage device may fail.

16. The medium of claim 13, wherein the non-redundant storage array conforms to RAID 0.

17. The medium of claim 13, further including:
maintaining a data structure in the intermediate device, the data structure storing a parameter, the parameter depending upon an extent of the subset, the extent having been already transferred from the first particular storage device to the intermediate device.

18. The medium of claim 17, wherein:
the plurality of data access requests include a write request to write data to a location in the subset, and further including:
   sending a further write request to the first particular storage device should the location be situated outside the extent.

19. The medium of claim 17, wherein:
the plurality of data access requests includes a write request to write data to a location in the subset, and further including:
   sending a further write request to the second particular storage device should the location be situated inside the extent.

20. The method of claim 19, further including:
sending a still further write request to the first particular first device should the location be situated inside the extent.

21. The medium of claim 13, further including:
assigning a first priority for the fulfilling of the plurality of data access requests with respect to a second priority for the transferring of the plurality of copies of blocks of data.

22. The medium of claim 21, wherein the first priority is higher than the second priority.

23. The medium of claim 13, wherein the act of transferring and the act of re-transferring jointly includes:
   (i) setting a first parameter indicating a size of the subset and further indicating a location of the subset;
   (ii) generating a request to copy a block of data from the subset to the buffer;
   (iii) generating a request to transfer the block of data from the buffer to the second particular storage device;
   (iv) setting a second parameter depending upon a cardinality of a set of blocks consisting of blocks of data copied from a location selected from a list consisting of the subset and the buffer and
   (v) repeating the acts (ii) through (iv), until a copy of the subset is stored in the second particular storage device.

24. The method of claim 13, wherein a background process comprises at least one act selected from a list consisting of the transferring of copies of blocks of data and the re-transferring of copies of blocks of data, the background process being capable of operating concurrently with the fulfilling of the plurality of data access requests from the client.

25. An intermediate device for a storage network, comprising:
   (A) a plurality of communication interfaces, the plurality of communication interfaces adapted for communication with a non-redundant array of storage devices storing at least one data set, and further adapted for communication with at least one client issuing a plurality of data access requests for access to the at least one data set;
   (B) at least one data transfer resource coupled to the plurality of communication interfaces, the data transfer resources transferring data via the plurality of communication interfaces and a logic engine, coupled to the plurality of communication interfaces, which, in response to detection of a condition of a first particular storage device comprises within the array, performs migration of a subset of the at least one data set stored in the first particular storage device to a second particular storage device being a spare storage device and identifies the second particular storage device as a member of the array, the migration including
(1) a first transferring of a plurality of copies of blocks of data from the subset to a buffer;
(2) a second transferring of the plurality of copies of blocks from the buffer to the second particular storage device; and
(3) fulfilling at least one particular data access request selected from the plurality of data access requests during said first transferring and said second transferring.

26. The intermediate device of claim 25, wherein the at least one data transfer resource comprises:
a plurality of driver modules, and
a plurality of configurable logic linking driver modules in the plurality of driver modules into data paths, the data paths including respective sets of driver modules.

27. The intermediate device of claim 26, wherein the plurality of driver modules includes:
at least one hardware driver module to manage the plurality of communication interfaces; and
one or more internal driver modules to perform data path tasks independently of the plurality of communication interfaces.

28. The intermediate device of claim 25, wherein the logic engine comprises data structures that store status information concerning said migration.

29. The intermediate device of claim 25, comprising data structures which store status information concerning progress of said migration, including a progress parameter indicating an extent of the subset, the extent of the subset being already copies to the second storage device.

30. The intermediate device of claim 25, wherein said detection of a condition comprises reception of a signal from said first particular storage device.

31. The intermediate device of claim 25, wherein said condition comprises an event indicating reception of a signal from said first particular storage device.

32. The intermediate device of claim 25, wherein the logic engine maintains a data structure in the intermediate device storing a progress parameter indicating an extend of the subset being already transferred to the second particular storage device.

33. The intermediate device of claim 32, wherein
the plurality of data access requests includes a first write request to write data to a location in the subset, and
the logic engine transfers a second write request to the first particular storage device if the location is outside the extent of the subset.

34. The intermediate device of claim 32, wherein
the plurality of data access requests includes a first write request to write data to a location in the subset, and
the logic engine transfers a second write request to the second particular storage device if the location is inside the extent of the subset.

35. The intermediate device of claim 32, wherein
the data access requests include a first write request to write data to a location in the data set, and
the logic engine transfers a second write request to the first particular storage device and to the second particular storage device if the location is inside said extent of the subset.

36. The intermediate device of claim 25, wherein
the logic engine assigns a first priority for the fulfilling of the at least one particular data access request, and
the logic engine further assigns a second priority for the transferring of copies of blocks.

37. The intermediate device of claim 36, wherein the first priority is higher than the second priority.

38. The intermediate device of claim 25, wherein the acts of transferring and re-transferring include:
(i) setting a first parameter indicating a size of the subset and further indicating a location of the subset;
(ii) generating a request to copy a block of data from the subset to the buffer;
(iii) generating a request to transfer the block of data from the buffer to the second particular device;
(iv) setting a second parameter indicating blocks from the subset stored in the second device; and
(v) repeating the acts (i) through (iv), until a copy of the subset is stored in the second device.

39. The intermediate device of claim 25, wherein at least one act selected from a list consisting of the transferring of copies of blocks and the re-transferring of copies of blocks is comprises within a background process, the background process being capable of operating during concurrent servicing of the plurality of data access requests from the client.

40. A storage server comprising:
(A) a plurality of communication interfaces adapted for communication with a non-redundant array of storage devices storing at least one data set, and further adapted for communication with at least one spare storage device and still further adapted for communication with at least one client issuing a plurality of data access requests for access to the at least one data set;
(B) a plurality of data processing resources coupled with the plurality of communication interfaces, the plurality of data processing resources transferring data among the plurality of communication interfaces, the plurality of data processing resources including:
(1) a plurality of hardware driver modules to manage respective communication interfaces in the plurality of communication interfaces,
(2) a plurality of internal driver modules to perform data path tasks, independently of the plurality of communication interfaces,
(3) a configurable logical connection linking a first plurality of driver modules in the plurality of hardware driver modules and a second plurality of driver modules in the plurality of internal driver modules into a plurality of data paths,
(4) a protocol server module coupled with the plurality of data paths, for a protocol supported on a communication interface in the plurality of communication interfaces, the protocol server recognizing a plurality of target identifiers in a session according to the protocol and the protocol server linking the sessions to a data path selected from the plurality of data paths in response to the target identifier, and
(5) a logic engine which identifies members of the array, and in response to a detection of a condition of a first particular storage device in the array, migrates the subset to a second particular storage device selected from the at least one spare storage device, the migrating being according to an assigned priority, and the logic engine further identifies the second particular storage device as a member of the array.

* * * * *